US006741383B2

(12) United States Patent
Huibers et al.

(10) Patent No.: US 6,741,383 B2
(45) Date of Patent: May 25, 2004

(54) DEFLECTABLE MICROMIRRORS WITH STOPPING MECHANISMS

(75) Inventors: Andrew G. Huibers, Mountain View, CA (US); Peter J. Heureux, Felton, CA (US); Satyadev R. Patel, Elk Grove, CA (US)

(73) Assignee: Reflectivity, Inc., Sunnyvale, CA (US)

( * ) Notice: Subject to any disclaimer, the term of this patent is extended or adjusted under 35 U.S.C. 154(b) by 0 days.

(21) Appl. No.: 10/155,744

(22) Filed: May 24, 2002

(65) Prior Publication Data

US 2002/0196524 A1 Dec. 26, 2002

Related U.S. Application Data

(63) Continuation-in-part of application No. 09/637,479, filed on Aug. 11, 2000, now Pat. No. 6,396,619.

(51) Int. Cl.$^7$ .............................................. G02B 20/00
(52) U.S. Cl. ..................................................... 359/291
(58) Field of Search ................. 359/290, 223, 359/297, 292, 295, 230, 320, 323, 214

(56) References Cited

U.S. PATENT DOCUMENTS

| | | |
|---|---|---|
| 3,553,364 A | 1/1971 | Lee |
| 3,600,798 A | 8/1971 | Lee |
| 3,746,911 A | 7/1973 | Nathanson et al. |
| 4,229,732 A | 10/1980 | Hartstein et al. |
| 4,317,611 A | 3/1982 | Petersen |
| 4,383,255 A | 5/1983 | Grandjean et al. |
| 4,492,435 A | 1/1985 | Banton et al. |
| 4,566,935 A | 1/1986 | Hornbeck |
| 4,571,603 A | 2/1986 | Hornbeck et al. |
| 4,596,992 A | 6/1986 | Hornbeck |
| 4,662,746 A | 5/1987 | Hornbeck |
| 4,710,732 A | 12/1987 | Hornbeck |

(List continued on next page.)

OTHER PUBLICATIONS

Cadman et al., "New Micromechanical Display Using Metallic Thin Films", IEEE Electron Device Letters, Jan. 1983, vol. EDL–4 No. 1, pp. 3–4.

Gerhard–Multhaupt et al., "Light–Valve Projection Displays—An Introduction", Displays, vol. 16, No. 1, 1995, Elsevier Science B.V., pp. 5–7.

Gerhard–Multhaupt, "Light–Valve Technologies for High–Definition Television Projection Displays", Displays, 1991, vol. 12, No. 3/4, pp. 115–128.

Hornbeck, "Digital Light Processing (TM) for High–Brightness, High Resolution Applications", Texas Instruments, Inc., date ;unknown, pp. 1–14.

Jaecklin, "Line–Addressable Torsional Micromirrors for Light Modulator Arrays", Sensor and Actuators A, 41–42, Elsevier Science, pp. 324–329.

Peterson, K.E., "Micromechanical Light Modulator Array Fabricated on Silicon", Applied Physics Letters, American Institute of Physics, vol. 31 No. 8, Oct. 15,1977, pp. 521–523.

(List continued on next page.)

Primary Examiner—Hung Xuan Dang
Assistant Examiner—Tuyen Tra
(74) Attorney, Agent, or Firm—Gregory R. Muir

(57) ABSTRACT

A spatial light modulator having a micromirror and one or more deflection limiting mechanisms, and a process for fabrication therefor. In one embodiment, the mirror support structure has a deflection stopping mechanism that limits the tilt angle of the reflective plate. Alternatively, a deflection stopping mechanism can be provided separate from the mirror support structure. The deflection stopping mechanism can be used in conjunction with one or more additional stopping mechanisms such as the abutment of a portion of the reflective plate against the substrate upon which it was constructed and/or abutment of the micromirror on a surface or structure of the circuit substrate.

12 Claims, 25 Drawing Sheets

U.S. PATENT DOCUMENTS

| | | | |
|---|---|---|---|
| 4,954,789 A | 9/1990 | Sampsell | |
| 5,078,479 A | 1/1992 | Vuilleumier | |
| 5,216,537 A | 6/1993 | Hornbeck | |
| 5,311,360 A | 5/1994 | Bloom et al. | |
| 5,392,151 A | 2/1995 | Nelson | |
| 5,535,047 A | 7/1996 | Hornbeck | |
| 5,552,925 A | 9/1996 | Worley | |
| 5,579,149 A | 11/1996 | Moret et al. | |
| 5,615,029 A | 3/1997 | Moddel et al. | |
| 5,768,009 A | 6/1998 | Little | |
| 5,784,190 A | 7/1998 | Worley | |
| 5,793,519 A | 8/1998 | Furlani et al. | |
| 5,808,780 A | 9/1998 | McDonald | |
| 5,835,256 A | 11/1998 | Huibers | |
| 5,999,306 A * | 12/1999 | Atobe et al. | 359/295 |
| 6,025,951 A | 2/2000 | Swart et al. | |
| 6,034,807 A * | 3/2000 | Little et al. | 359/227 |
| 6,038,056 A | 3/2000 | Florence et al. | |
| 6,046,840 A | 4/2000 | Huibers | |
| 6,072,617 A | 6/2000 | Henck | |
| 6,075,512 A | 6/2000 | Patel et al. | |
| 6,099,132 A | 8/2000 | Kaeriyama | |
| 6,147,790 A | 11/2000 | Meier et al. | |
| 6,356,378 B1 * | 3/2002 | Huibers | 359/291 |
| 6,529,310 B1 * | 3/2003 | Huibers et al. | 359/291 |

OTHER PUBLICATIONS

Peterson, "Silicon Torsional Scanning Mirror", IBM J. Res. Develop., vol. 24 No. 5, Sep. 1980, pp. 631–637.

Thomas et al., "The Mirror Matrix Tube: A Novel Light Valve for Projection Displays", IEEE Transactions on Electron Devices, vol. Ed–22 No. 9, Sep. 1975, pp. 765–775.

Yoder, "The Digital Display Technology of the Future", Texas Instruments, Inc., date unknown, pp. 1–11.

* cited by examiner

DEFLECTABLE MICROMIRRORS WITH STOPPING MECHANISMS

RELATED CASES

This application is a continuation-in-part of U.S. patent application Ser. No. 09/637,479 to Huibers et al. filed Aug. 11, 2000 now U.S. Pat. No. 6,396,619, the subject matter of which is also incorporated herein by reference. This application is also related to U.S. Pat. Nos. 5,835,256 to Huibers, 6,046,840 to Huibers, 6,290,864 to Patel et al. and 6,388,661 to Richards, the subject matter of each being incorporated herein by reference.

The present invention pertains generally to the field of micro-electromechanical systems (MEMS). More specifically, the present invention pertains to the field of MEMS spatial light modulators and systems and beam steering devices, such as display projection systems, printing systems, and light beam switching systems that utilize MEMS components.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Figure 1:
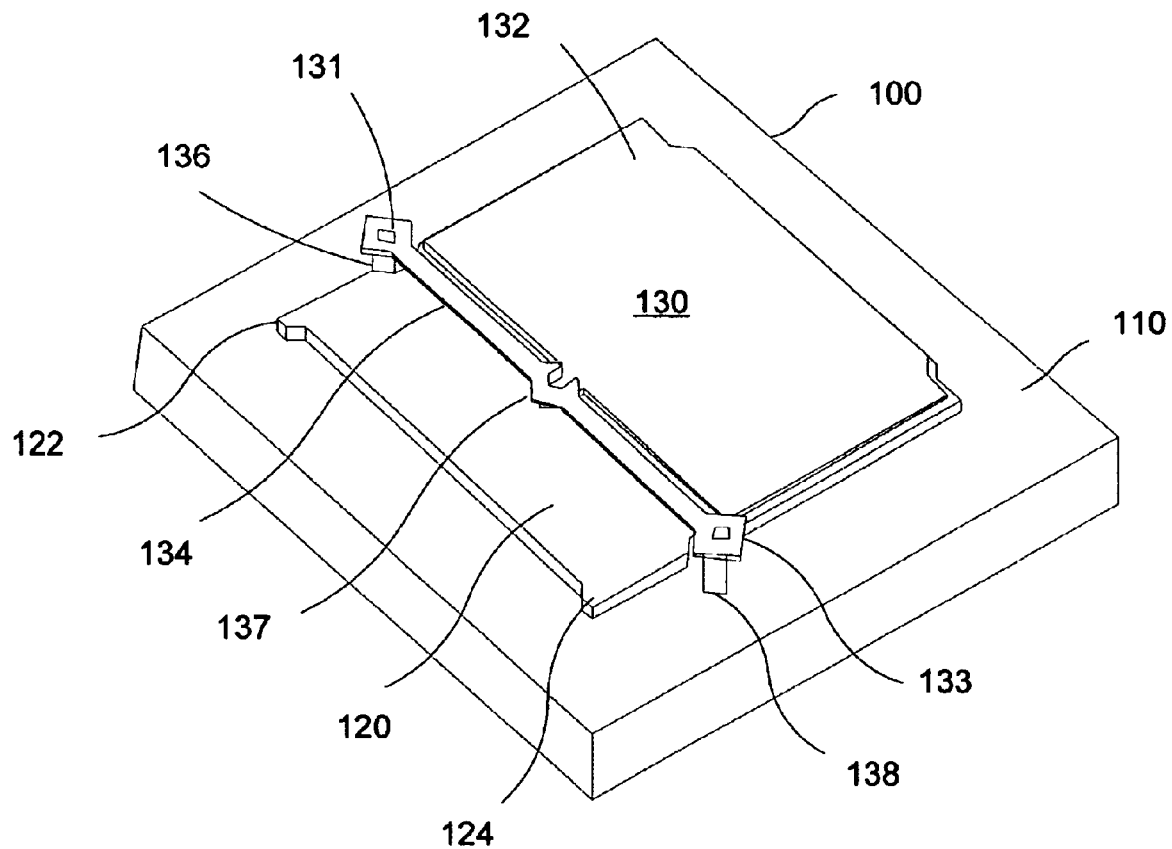
FIG. 1 illustrates a deflectable micro-mirror structure that may be incorporated as part of a spatial light modulator in accordance with one embodiment of the present invention.

The present invention provides a spatial light modulator that has a higher resolution and an increased fill factor. The present invention also provides a spatial light modulator that has an increased contrast ratio. The present invention further provides a spatial light modulator that operates in the absence of polarized light and that has improved electromechanical performance and robustness with respect to manufacturing.

The present invention achieves these benefits by carefully controlling the degree of tilt of each mirror in the array. This control is made possible by the stopping mechanisms for each mirror. The plurality of stopping mechanisms can be constructed so as to abut the corresponding mirror at the same time. Or, a back-up stopping mechanism could be provided in the event that the mirror is not sufficiently stopped by the primary mechanism. In this way, the maximum degree of tilt of each mirror is accurately determined over a wide range of manufacturing tolerances and actuating forces.

According to one embodiment of the present invention, the spatial light modulator has an optically transmissive substrate and a semiconductor substrate. An array of reflective elements are suspended from underneath the optically transmissive substrate, and are positioned directly across from the semiconductor substrate. The semiconductor substrate includes an array of electrodes and electronic circuitry for selectively deflecting individual reflective elements by electrostatic force. In operation, as the individual reflective elements deflect, light beams that are incident to and reflected back through the optically transmissive substrate are spatially modulated. In accordance with one embodiment, each reflective element has a front surface that faces the optically transmissive substrate and a back surface that faces the semiconductor substrate. Each reflective element is deflectably attached to the optically transmissive substrate by means of a mirror support structure. The mirror support structure includes one or more contact points that are attached (directly or indirectly) to the optically transmissive substrate. The mirror support structure also includes a torsion hinge that extends across the back surface of the reflective element, attaching thereto at one or more places.

The mirror support structure of one embodiment is reinforced with deflection stoppers configured for resisting deflection of the reflective element beyond a pre-determined tilt angle. Specifically, the deflection stoppers are configured such that, when the reflective element is deflected to the pre-determined tilt angle, the reflective element can come into contact with the deflection stoppers. In addition, one end of the reflective element can come into contact with the optically transmissive substrate. In this way, mechanical robustness of the mirror support structure is significantly improved.

In furtherance of the present invention, one embodiment of the mirror support structure includes an attraction electrode that is attached to the back surface of the reflective element. When a voltage bias is applied between the attraction electrode and a corresponding actuating electrode on the semiconductor substrate, the attraction electrode can be pulled towards the actuating electrode, causing the reflective element to deflect. In one embodiment, the mirror support structure and the attraction electrode are composed of a same conductive laminate. Therefore, the reflective element needs not be conductive (though the reflective element, in another embodiment, can be conductive and act as the electrode). Consequently, mechanical and reflective properties of the reflective element can be optimized without regard to conductivity. Fabrication flexibility is also increased because the present embodiment does not require a metal coating step after sacrificial silicon layers are removed.

In another embodiment of the invention, a microelectromechanical device is provided which includes a substrate having a first surface, a support structure coupled to the first surface of the substrate, and a reflective element deflectably coupled to the substrate via the support structure, where the support structure has a stopping mechanism constructed for resisting deflection of the reflective element beyond a predetermined tilt angle. The support structure may comprise a first end and a second end that are attached to said first surface, and the stopping mechanism of the support structure may comprise a first deflection stopper positioned near the first end and a second deflection stopper positioned near the second end. The reflective element preferably comprises a substantially rigid reflective plate and the substrate is preferably an optically transmissive substrate. Also, the stopping mechanism is disposed on a side of the reflective element opposite to that of the substrate, and the support structure preferably comprises hinges and posts, the posts extending past the reflective element to connect directly or indirectly to the substrate, and each hinge extending from the posts and connecting to the reflective element.

In yet another embodiment of the present invention, a spatial light modulator is provided which comprises a first substrate having a first surface, a deflectable element deflectably coupled to the first surface of the first substrate, a second substrate positioned across from and spaced apart from the first surface of the first substrate, the second substrate comprising electronic circuitry adapted for causing the deflectable element to deflect; and a primary stopping mechanism and a secondary stopping mechanism, each for stopping deflection of the deflectable element when deflected by the electronic circuitry. The primary and secondary stopping mechanisms are constructed to stop movement of the deflectable element at different angles of deflection of the deflectable element, and may be constructed in different planes relative to the deflectable element. One of the primary and secondary stopping mechanisms preferably comprises a portion or extension of the deflectable element which abuts against the first substrate during deflection of the deflectable element, and the other of the primary and secondary stopping mechanisms preferably comprises support structure connected to the first substrate which is disposed on a side of the deflectable element opposite to the side on which the first substrate is disposed, the deflectable element adapted to abut against the support structure when the deflectable element is deflected. The secondary stopping mechanism preferably comprises a portion of the hinge, the hinge portion constructed so as to abut against the deflectable element when the deflectable element is deflected, and a gap is disposed between the first substrate and the deflectable element, and a second gap is disposed between the deflectable element and one of the primary and secondary stopping mechanisms. Also, one of the primary and secondary stopping mechanisms comprises a post or wall connected at one end to the first substrate and having a second end with a protrusion which is adapted to abut against the deflectable element when the deflectable element pivots up to a predetermined angle, whereas the secondary stopping mechanism is constructed to avoid abutment against the deflectable element unless the primary stopping mechanism fails.

In still another embodiment of the invention, a spatial light modulator is provided which comprises a first substrate, a deflectable element held on the first substrate via a hinge and stop assembly, the hinge connected to the deflectable element so as to allow the deflectable element to pivot around an axis, and the stop positioned to arrest the pivoting of the deflectable element. The hinge and stop assembly comprises a post connecting to the first substrate, the deflectable element constructed to abut against a portion of the hinge and/or post when deflected. The deflectable element may be held on a bottom surface of the first substrate, and wherein the deflectable element has first and second portions such that during deflection of the deflectable element, the second portion moves towards the bottom surface as the first portion moves away from the bottom surface. The first portion can abut against an area of the hinge and stop assembly, and the second portion can abuts against an area of the first substrate.

In yet a further embodiment of the invention, a spatial light modulator is provided comprising a first substrate, a deflectable element pivotably held on the first substrate, a post or wall extending from the first substrate and having a lip or protrusion which extends past a portion of the deflectable element such that when the deflectable element pivots, a portion of the deflectable element abuts against the lip or protrusion so as to stop the movement of the deflectable element. In another embodiment, a spatial light modulator comprises in cross section, an optically transmissive substrate, a first gap disposed below the optically transmissive substrate, a pivotable mirror disposed below the first gap, a second gap disposed below the mirror, and a deflection stopper disposed below the second gap. Also provided is a connector which connects the pivotable mirror with the optically transmissive substrate, the connector preferably comprising the deflection stopper. The deflection stopper may be part of a hinge and post assembly for pivotably holding the mirror to the optically transmissive substrate, or, the hinge and post assembly can be spaced apart from the deflection stopper with the hinge disposed below the second gap. The deflection stopper can comprise a protrusion which extends below the second gap and a wall or post which connects to the optically transmissive substrate.

Embodiments of the present invention include the above and further include a spatial light modulator fabrication process. In one embodiment, the process includes the steps of: (a) depositing a sacrificial (e.g. silicon) layer on an optically transmissive substrate; (b) depositing a reflective laminate on the sacrificial layer; (c) pattern-etching the reflective laminate to define a reflective element; (d) depositing another sacrificial (e.g. silicon) layer; (e) pattern-etching the second sacrificial layer to expose a portion of the reflective element; (f) etching a pattern of holes through the sacrificial layers such that subsequent layers can be attached to the optically transmissive substrate via the holes; (g) depositing a hinge-electrode laminate layer on the second sacrificial layer and on the exposed portion of the reflective element; (h) pattern-etching the hinge-electrode laminate to define a hinge-electrode that is attached to the optically transmissive substrate through the holes and that is attached to the exposed portion of the reflective element; (i) etching the first sacrificial layer and the second sacrificial layer to release the reflective element; (j) forming addressing circuitry and electrodes on a semiconductor substrate; and (k) aligning and joining the optically transmissive substrate and the semiconductor substrate.

In cross section, the spatial light modulator has an optically transmissive substrate, a first gap below the optically transmissive substrate, a deflectable element below the first gap, a second gap below the deflectable element, a hinge below the second gap, a third gap below the hinge, and a second (e.g. circuit) substrate below the third gap. The hinge is substantially entirely blocked from view by the deflectable element (when viewing through the optically transmissive substrate). As such, the hinge is disposed on a side of the deflectable element opposite to that of the optically transmissive substrate. The hinge is connected to the bottom surface of the deflectable element (not on the edges of the deflectable element in most cases). Posts or walls can be provided which extend from the hinge to the optically transmissive substrate. The hinge can extend across the middle of the deflectable element, with the same area of deflectable element on either side (or the hinge could divide the deflectable element in other ways, e.g. ⅓ on one side and ⅔ on the other). With some deflectable element extending on either side of the hinge, movement of one side of the deflectable element in one direction results in movement of the other side of the deflectable element in the other direction.

The hinge can also be provided flush against the deflectable element (though still with the deflectable element between the hinge and the optically transmissive substrate). Preferably, however, the hinge is connected to a center portion of the deflectable element so as to allow for an elongated hinge (thus reducing flexing, torqueing and/or stress to any one part of the hinge). The deflectable element can be provided with a laminate support structure which can comprise multiple layers of dielectric material. Also, the deflectable element can comprise a layer which is both reflective and conductive (e.g. a metal layer such as gold or aluminum) or separate reflective and conductive layers. The deflectable element and hinge can be formed by LPCVD deposition, whereas the circuit substrate utilized for actuating the deflectable element can be formed using standard VLSI/CMOS processes.

In another embodiment of the invention a spatial light modulator is disclosed that comprises a substrate transmissive to visible light; a micromirror support structure on said substrate; and a micromirror deflectably coupled to said substrate via said support; wherein the support structure comprises a stopping mechanism constructed for resisting deflection of said micromirror beyond a particular angle; and wherein the stopping mechanism comprises a saw-tooth projection.

In a further embodiment of the invention, a spatial light modulator comprises a first substrate having a first surface; a deflectable element deflectably coupled to the first surface of the first substrate; a second substrate positioned across from and spaced apart from said first surface of said first substrate, said second substrate comprising electronic circuitry adapted for causing said deflectable element to deflect; and a plurality of a) a first stopping mechanism held on the first substrate for stopping movement of the deflectable element at a particular angle of deflection, b) a second stopping mechanism comprising a surface or protrusion from the deflectable element that abuts against the first substrate at a particular angle of deflection, and c) a surface or protrusion on the second substrate for stopping deflection of the deflectable element at a particular angle of deflection.

In yet another embodiment of the invention, a spatial light modulator, comprises a first substrate; a deflectable element having a landing pad and that is held on the first substrate via a hinge and stop assembly, the hinge connected to the deflectable element so as to allow the deflectable element to pivot around an axis, and the stop positioned to arrest the pivoting of the deflectable element by abutting against the landing pad on the deflectable element.

In a further embodiment of the invention, a spatial light modulator comprises a first substrate that is transmissive to visible light; a deflectable element pivotably held on the first substrate via a hinge; a stopping mechanism constructed such that when the deflectable element pivots, a portion of the deflectable element abuts against the stopping mechanism so as to stop the movement of the deflectable element; wherein at least one of the deflectable element, hinge and stopping mechanism is formed of a laminate of three or more layers.

In a still further embodiment of the invention, a spatial light modulator comprises in cross section: an optically transmissive substrate; a first gap disposed below the optically transmissive substrate; a pivotable mirror disposed below the first gap via a hinge; a second gap disposed below the mirror; and a deflection stopper disposed below the second gap; wherein the deflection stopper has a total thickness and rigidity greater than a total thickness and rigidity of the hinge.

In another embodiment of the invention, a micromirror device fabrication process comprises (a) depositing a first spacer layer on an optically transmissive substrate; (b) depositing a reflective layer or laminate on said first spacer layer; (c) pattern-etching said reflective layer or laminate to define a reflective element; (d) depositing a second spacer layer on said first spacer layer and said reflective element; (e) etching a portion of said second spacer layer down towards said reflective element; (f) etching through a portion of both said first spacer layer and said second spacer layer down towards the optically transmissive substrate; (g) depositing a hinge layer or laminate and patterning the same to form a hinge and depositing a support structure layer or laminate and patterning the same to form a support structure; (h) removing the first and second spacer layers so that the reflective element is pivotably held on the optically transmissive substrate via the hinge and support structure; and (i) wherein the hinge layer or laminate and the support structure layer or laminate are deposited as different steps within the method and of different materials and or material thicknesses.

In the following description, for purposes of explanation, numerous specific details are set forth in order to provide a thorough understanding of the present invention. However, it will be apparent to one skilled in the art that the present invention may be practiced without these specific details. In other instances, well-known structures and devices are not described in detail in order to avoid obscuring aspects of the present invention.

Figure 2:
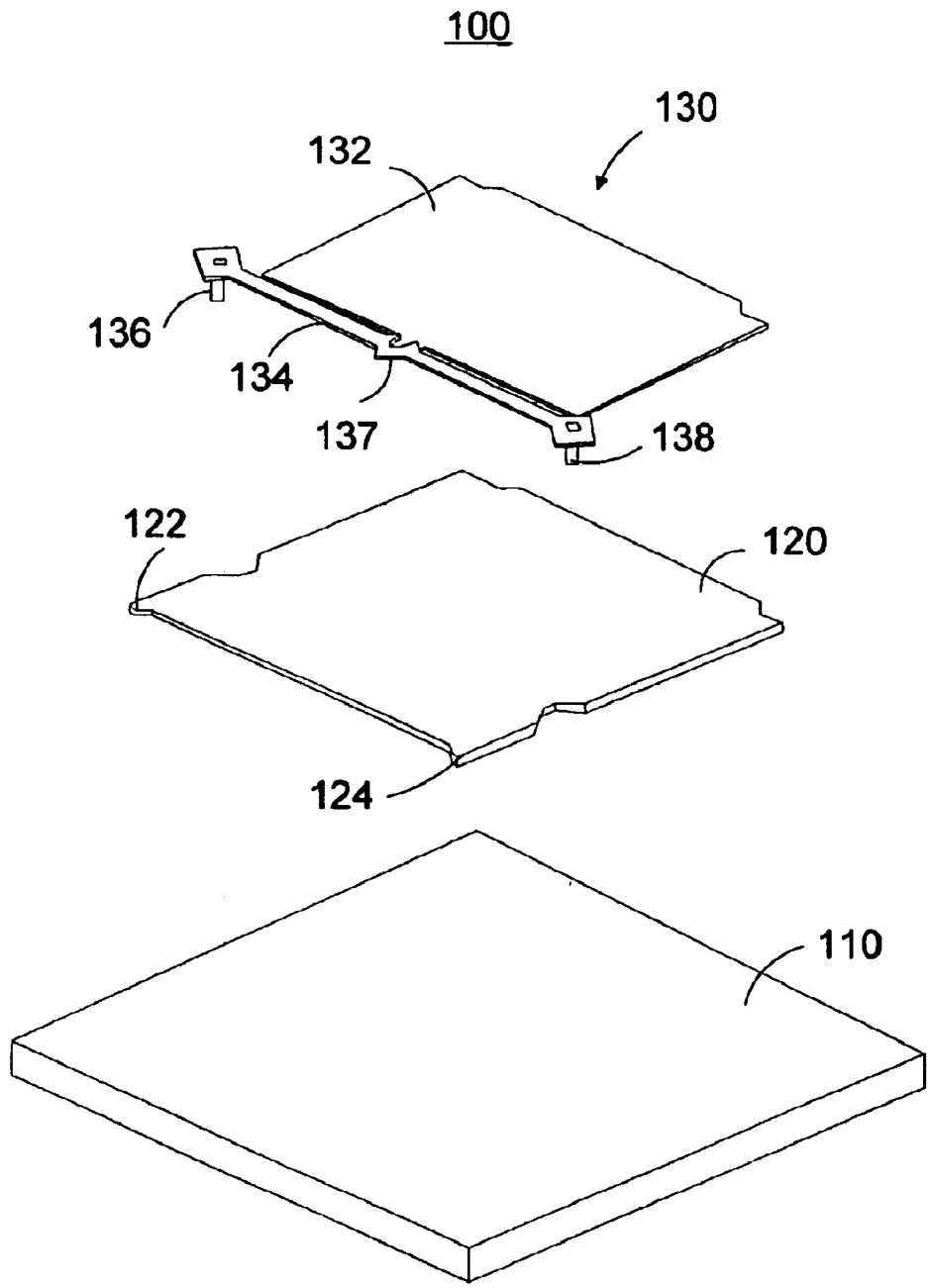
FIG. 2 illustrates an exploded view of the deflectable micro-mirror structure of FIG. 1.

FIG. 1 illustrates a deflectable micro-mirror structure 100 in accordance with one embodiment of the present invention. FIG. 2 illustrates an exploded view of the deflectable micro-mirror structure 100. It should be appreciated that micro-mirror structure 100 is part of a mirror array. However, for simplicity, other micro-mirror structures of the array are not shown FIG. 1. It should be appreciated that the number of mirror structures within a mirror array may be very large. For example, in a typical SLM implementation having 1024×768 pixels, the mirror array may have more than seven hundred fifty thousand micro-mirror structures. Additionally, it should be noted that the semiconductor substrate containing electronic circuitry for actuating the micro-mirror structure 100 is not illustrated in FIGS. 1 and 2 to avoid obscuring aspects of the present embodiment.

In the embodiment as shown in FIGS. 1 and 2, a mirror plate 120 of micro-mirror structure 100 is suspended above, and deflectably coupled to, optically transmissive substrate 110 by means of a mirror support structure 130. Mirror plate 120 has a reflective front surface that faces the optically transmissive substrate 110, and a back surface that faces the semiconductor substrate. In one embodiment, mirror plate 120 is substantially rigid and may be made up of a laminate having layers of silicon nitride and aluminum.

With reference still to FIGS. 1 and 2, mirror support structure 130 includes two hinge supports 136 and 138 attached to the optically transmissive substrate 110. The mirror support structure 130 also includes a torsion hinge 134 that extends across and attaches to the back surface of mirror plate 120. Also attached to the back surface of mirror plate 120 is an electrode 132. In the embodiment as illustrated, electrode 132 is electrically conductive and is connected to torsion hinge 134 via a support 137. Support 137, as shown, is shorter than hinge supports 136 and 138 such that mirror plate 120 is spaced apart from substrate 110 when undeflected.

Also illustrated in FIGS. 1 and 2 are deflection stoppers 131 and 133 that are configured for resisting deflection of mirror plate 120 beyond a pre-determined tilt angle. Particularly, when mirror plate 120 is deflected to the pre-determined tilt angle, part of mirror plate 120 can come into contact with deflection stoppers 131 and 133. In addition, in the present embodiment, micro-mirror structure 100 is configured such that, when the deflecting mirror plate 120 comes into contact with deflection stoppers 131 and 133, the mirror plate 120 can also come into contact with optically transmissive substrate 110. In the illustrated embodiment, mirror plate 120 includes bumps 122 and 124 positioned along the substrate-touching edge such that the area of contact between mirror plate 120 and substrate 110 is reduced.

Figure 3A:
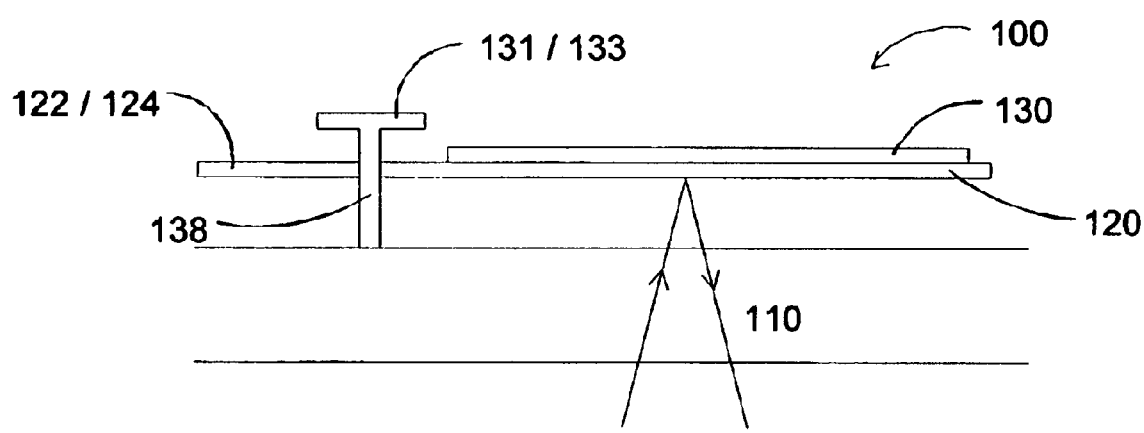
FIGS. 3A and 3B illustrate a deflection stopping mechanism of the micro-mirror structure of FIG. 1 in accordance with one embodiment of the present invention.
Figure 3B:
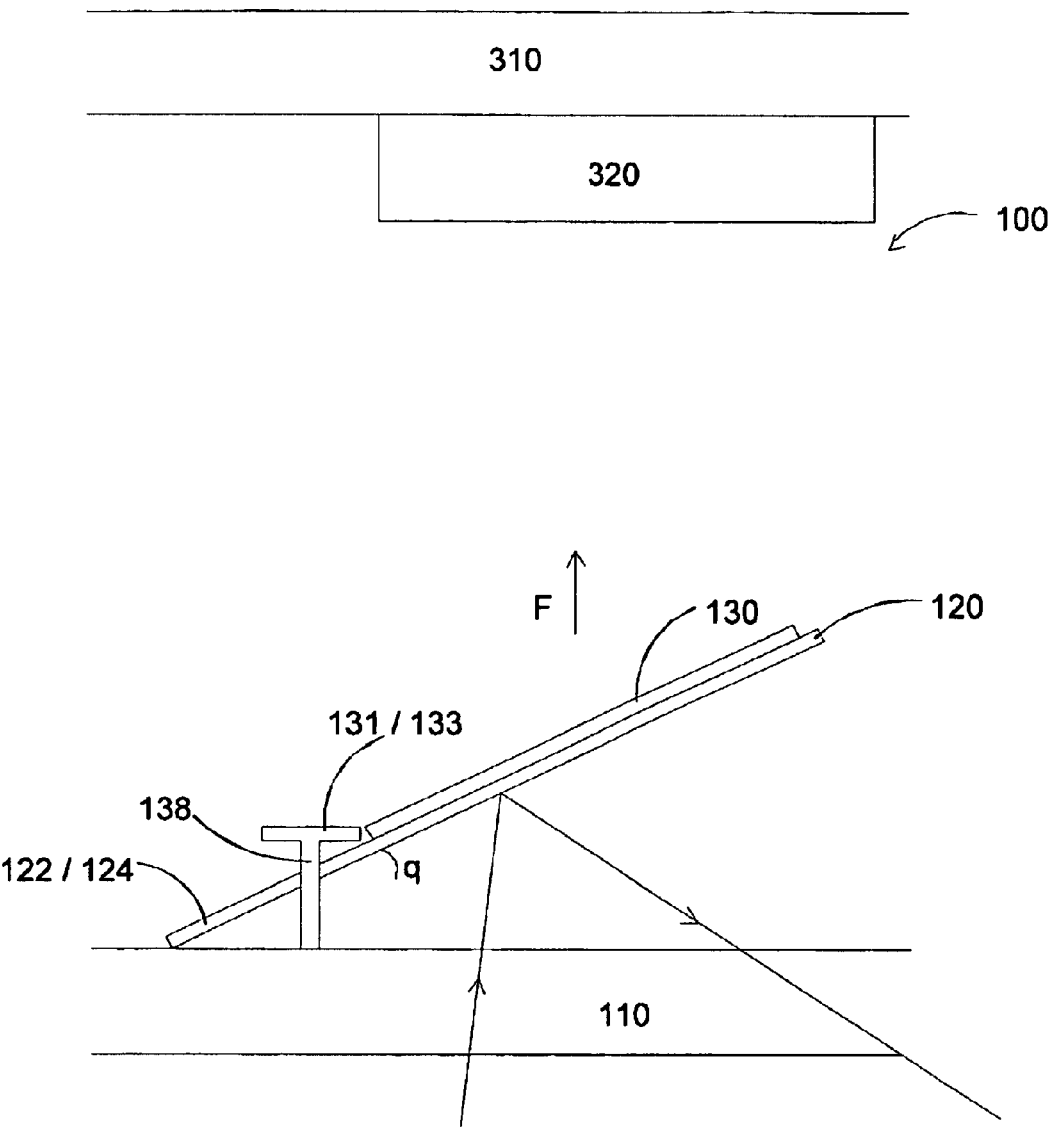

FIGS. 3A and 3B illustrate a deflection stopping mechanism of micro-mirror structure 100 in accordance with one embodiment of the present invention. FIG. 3A illustrates a side-view of micro-mirror structure 100 when mirror plate 120 is undeflected. FIG. 3B illustrates a side-view of micro-mirror structure 100 when mirror plate 120 is deflected to a pre-determined tilt angle, θ. Also illustrated are semiconductor substrate 310 and one or more attraction electrodes 320 for deflecting mirror plate 120.

As shown in FIG. 3A, when undeflected, mirror plate 120 is supported above optically transmissive substrate 110. However, in FIG. 3B, when a voltage bias between attraction electrode 320 and electrode 130 is applied, an electrostatic force F is generated, causing mirror plate 120 to deflect towards semiconductor substrate 310. Deflection of mirror plate 120 is stopped at a pre-determined tilt angle, or deflection angle, θ. As illustrated in FIG. 3B, mirror plate 120 comes into contact with deflection stoppers 131/133, and bumps 122/124 come into contact with substrate 110 at tilt angle θ.

In one embodiment, the tilt angle θ at which bumps 122/124 come into contact with substrate 110 is approximately 15°. However, it should be appreciated that the title angle θ is dependent on the geometry and dimensions of the micro-mirror structure and that many other tilt angles are within the scope of the present invention. Further, it should be noted that the angle at which mirror plate 120 comes into contact with deflection stoppers 131/133 may be slightly different from the angle at which bumps 122/124 come into contact with substrate 110. For instance, in another embodiment of the present invention, deflection stoppers may be used as a safeguard against excessive stretching of the torsion hinge. Therefore, in that embodiment, the angle at which the mirror plate comes into contact with the deflection stoppers may be slightly larger than the angle at which the mirror plate comes into contact with the substrate. Or, only the deflection stoppers could be used to stop the movement of the mirror plate, or, the deflection stoppers could be used to stop the movement of the mirror plate, with the stop against the light transmissive substrate being used as the back-up stopping mechanism.

Figure 6:
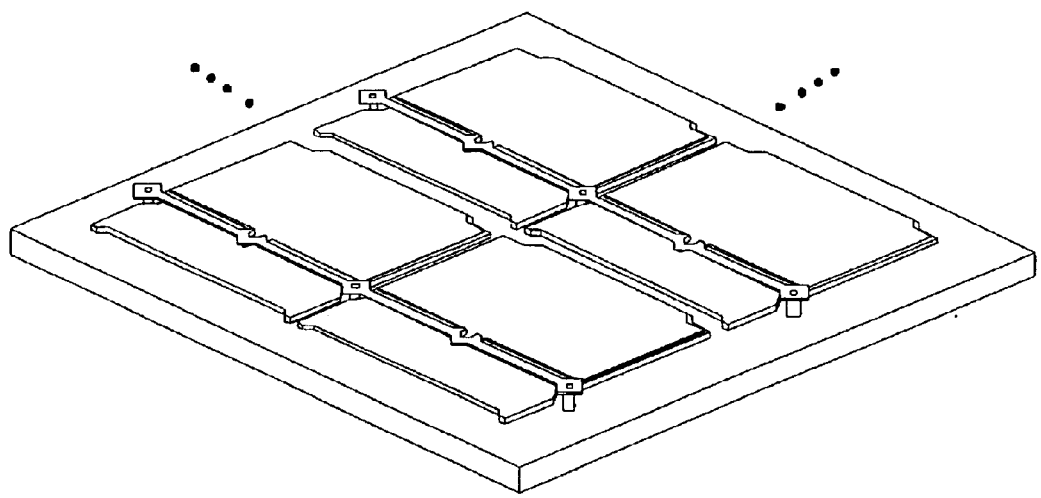
FIG. 6 illustrates a perspective view of a small section of an exemplary mirror array that includes a micro-mirror structure of FIG. 1 according to one embodiment of the present invention.

A small section of an exemplary mirror array 600 according to one embodiment of the present invention is shown in FIG. 6. As illustrated, because the torsion hinges are attached to the back surface of the mirror plates, the fill factor of the array 600 is very high. Almost the entire surface of the optically transmissive substrate 610 can be covered with reflective surfaces.

Figure 4:
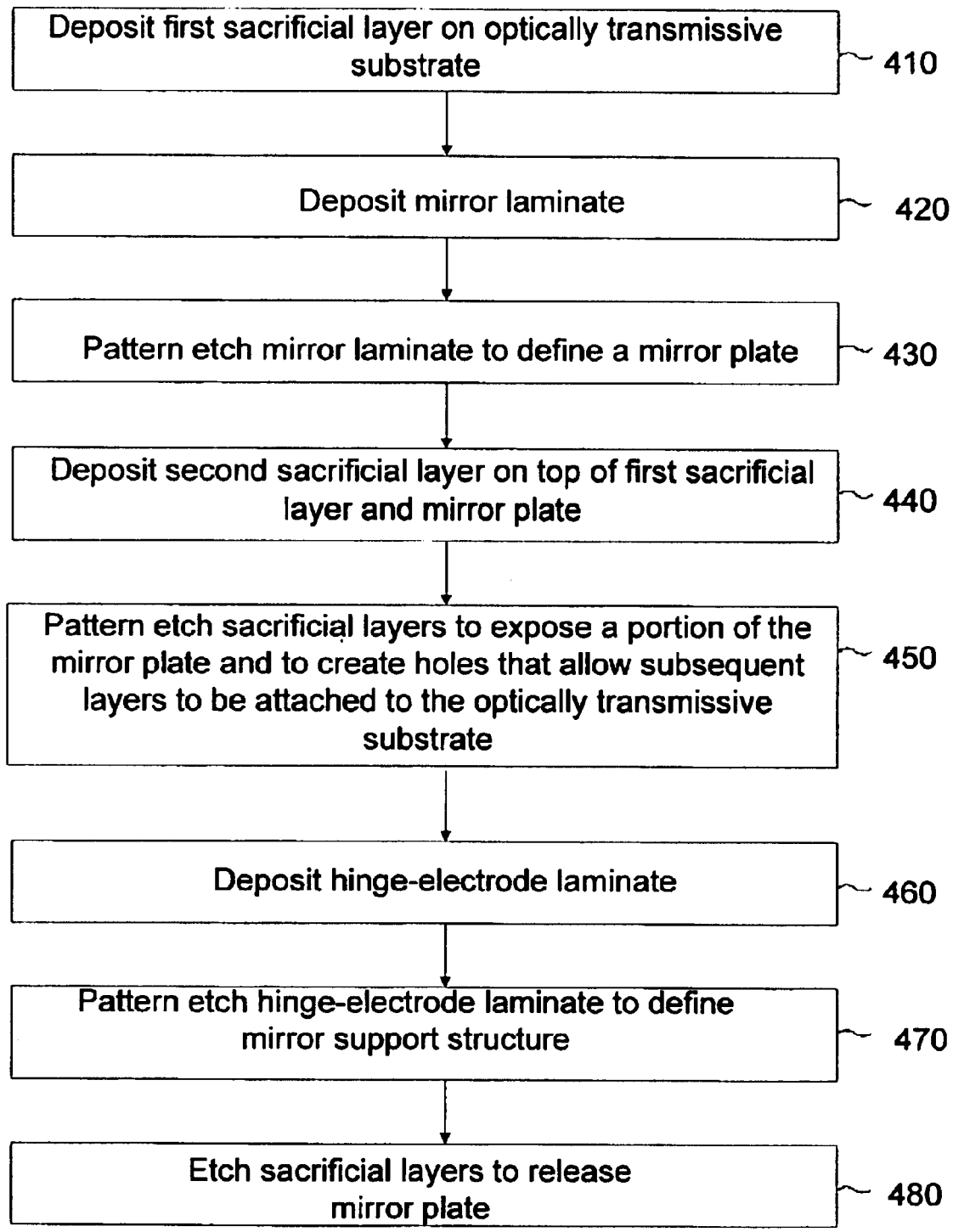
FIG. 4 is a flow diagram illustrating steps of a fabrication process for producing micro-mirror structures according to one embodiment of the present invention.

FIG. 4 is a flow diagram illustrating steps of a fabrication process 400 for producing micro-mirror structures according to one embodiment of the present invention. In the present embodiment, micro-mirror structures (e.g., structure 100) are formed on top of an optically transmissive substrate (e.g., substrate 110), which is made from glass or other materials that can withstand subsequent processing temperatures.

At shown in FIG. 4, at step 410, a first sacrificial layer (of e.g. silicon) is deposited on the optically transmissive substrate. In the present embodiment, the first sacrificial layer of silicon can be approximately 5000 A to 8000 A, or in a range of from 10,000 to 20,000 A (or even more than 30,000 A) thick. Other sacrificial material (e.g. polymers) other than silicon could be used.

At step 420, mirror laminate is deposited on the first sacrificial layer. In one embodiment, the mirror laminate includes a layer of aluminum sandwiched by two layers of silicon nitride. In other embodiments, the mirror laminate may include only a layer of aluminum and a layer of silicon nitride. Or, a multi-layer arrangement with multiple layers of aluminum and/or silicon nitride could be used. Other materials besides aluminum (such as other conductive and reflective metals) could be used. And, other materials besides silicon nitride are envisioned (e.g. silicon dioxide). In a typical implementation, each silicon nitride layer is approximately 1400 A thick, and the aluminum layer is approximately 700 A thick. Further, to enhance the reflectivity of the mirror laminate, one or more dielectric films that act as a reflective coating may be deposited on the mirror laminate.

Figure 5A:
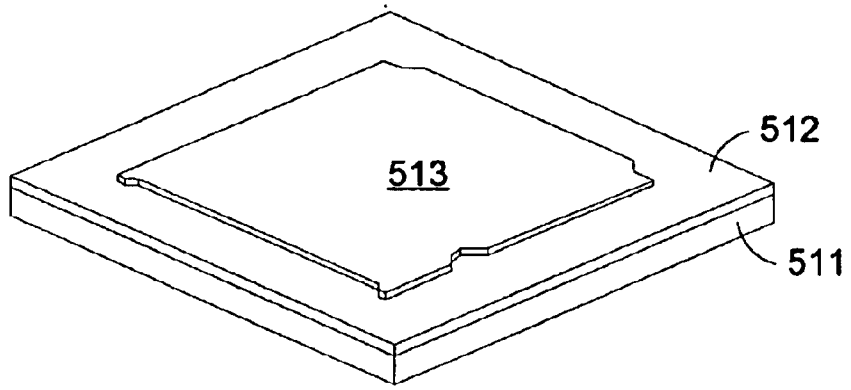
FIG. 5A illustrates a perspective view of a portion of a substrate after a mirror patterning step of the fabrication process of FIG. 4.

At step 430, the mirror laminate is patterned to define a mirror plate. A perspective view of a portion of a substrate after step 430 is illustrated in FIG. 5A. Particularly, an optically transmissive substrate 511, a sacrificial layer 512 and a mirror plate 513 are shown. It should also be noted that, in a typical SLM implementation in accordance with the present invention, an entire array of micro-mirrors are fabricated at the same time. For simplicity, other mirror plates that are formed on the substrate 511 are not illustrated.

With reference again to FIG. 4, at step 440, a second sacrificial silicon layer is deposited on top of the first sacrificial silicon layer and the mirror plate. In one embodiment, the second sacrificial silicon layer is approximately 2500–5000 A thick.

Figure 5B:
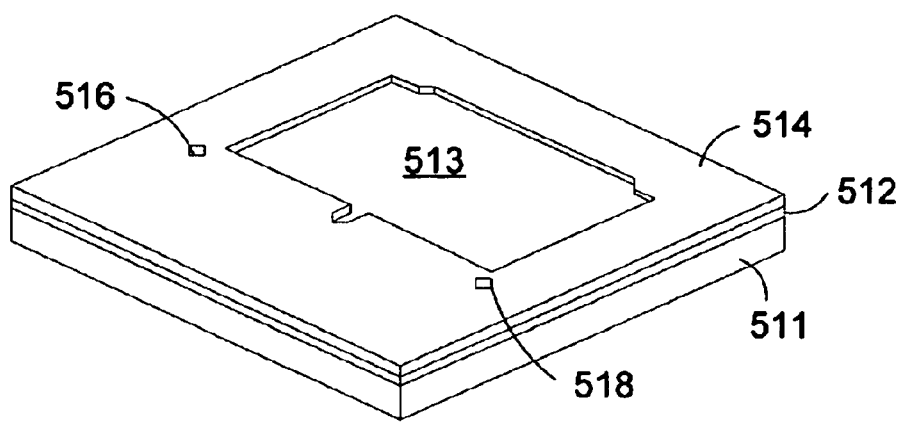
FIG. 5B illustrates a perspective view of a portion of a substrate after an etching step of the fabrication process of FIG. 4.

Then, at step 450, the sacrificial silicon layers are pattern etched to expose a portion of the mirror plate and to create two holes that allow subsequent layers to be attached to the optically transmissive substrate. A perspective view of a portion of substrate 511 after the etching step 450 is illustrated in FIG. 5B. In particular, optically transmissive substrate 511, sacrificial layer 512, mirror plate 513, and another sacrificial layer 514 that is patterned to expose a portion of the mirror 513 are shown. Also illustrated are two holes 516 and 518 that are also pattern-etched into the sacrificial layers 512 and 514 such that subsequent layers can be deposited through holes 516 and 518 onto optically transmissive substrate 511.

In the embodiment as illustrated in FIG. 5B, a substantial portion of the mirror plate 513 is exposed such that subsequent layers can be attached thereon. However, it should be noted that it is optional to expose a substantial portion of the mirror plate 513. In another embodiment, several openings may be pattern etched through the second sacrificial layer such that subsequent layers can be attached to the mirror plate via the openings.

At step 460, a hinge-electrode laminate is deposited on top of the second sacrificial layer. Particularly, in one embodiment, the hinge-electrode laminate covers the exposed portion of the mirror plate and portions of the optically transmissive substrate through the holes formed at step 450. In the present embodiment, the hinge-electrode laminate includes a 500 A layer of silicon nitride and a 500 A layer of aluminum. Other metals may be substituted for the aluminum, such as titanium or titanium nitride. Other laminate materials that can function as conductors and have good mechanical properties may also be used. Other metals, which are both conductive and reflective, could be formed. Or, a conductive layer could be made out of metal, and a separate metal or non-metal reflective layer or layers (e.g. two layers with different indices of refraction) could be formed.

Figure 5C:
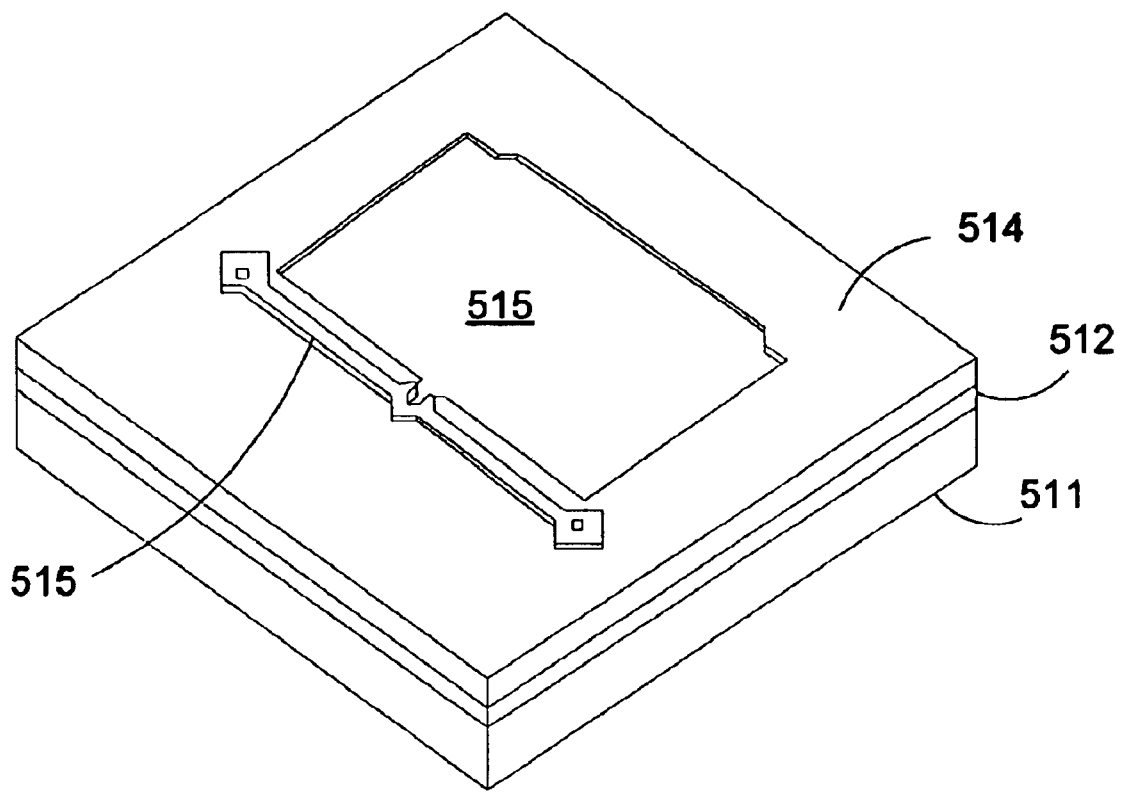
FIG. 5C illustrates a perspective view of a portion of a substrate after another etching step of the fabrication process of FIG. 4.

At step 470, the hinge-electrode laminate is etched to define a mirror support structure. A perspective view of a portion of substrate 511 after the etching step 470 is illustrated in FIG. 5C. Optically transmissive substrate 511, sacrificial layer 512, mirror plate 513 (not exposed), another sacrificial layer 514, and mirror support structure 515 are shown in FIG. 5C. Mirror support structure 515 as shown has an electrode portion that is attached to the mirror plate 513, and a mirror support structure that is attached to the optically transmissive substrate 511.

At step 480, the sacrificial silicon layers are etched away to release the mirror plate. The resulting micro-mirror structure is similar to micro-structure 100, and is ready to be sandwiched with a semiconductor substrate having electrodes and electronic circuitry therein to form a light valve device. The process for forming the semiconductor substrates for actuation of the micro-mirror structure is described in U.S. Pat. No. 5,835,256 and co-pending application Ser. No. 09/160,361, which are incorporated by reference, and is therefore not discussed herein to avoid obscuring aspects of the present invention.

Figure 7A:
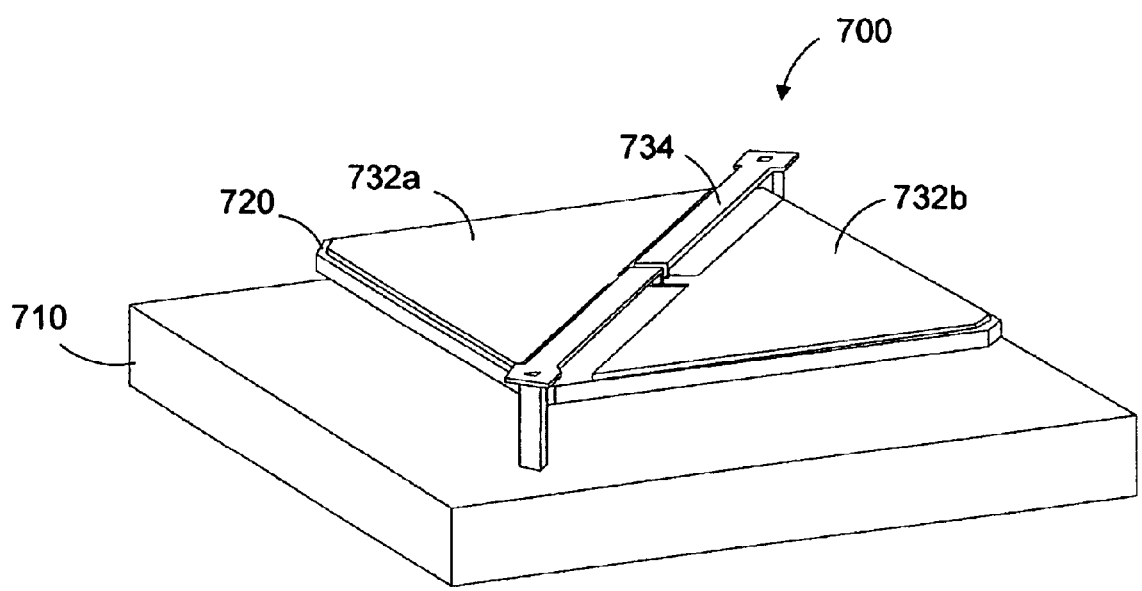
FIG. 7A illustrates a perspective view of a deflectable micro-mirror structure in accordance with another embodiment of the present invention.
Figure 7B:
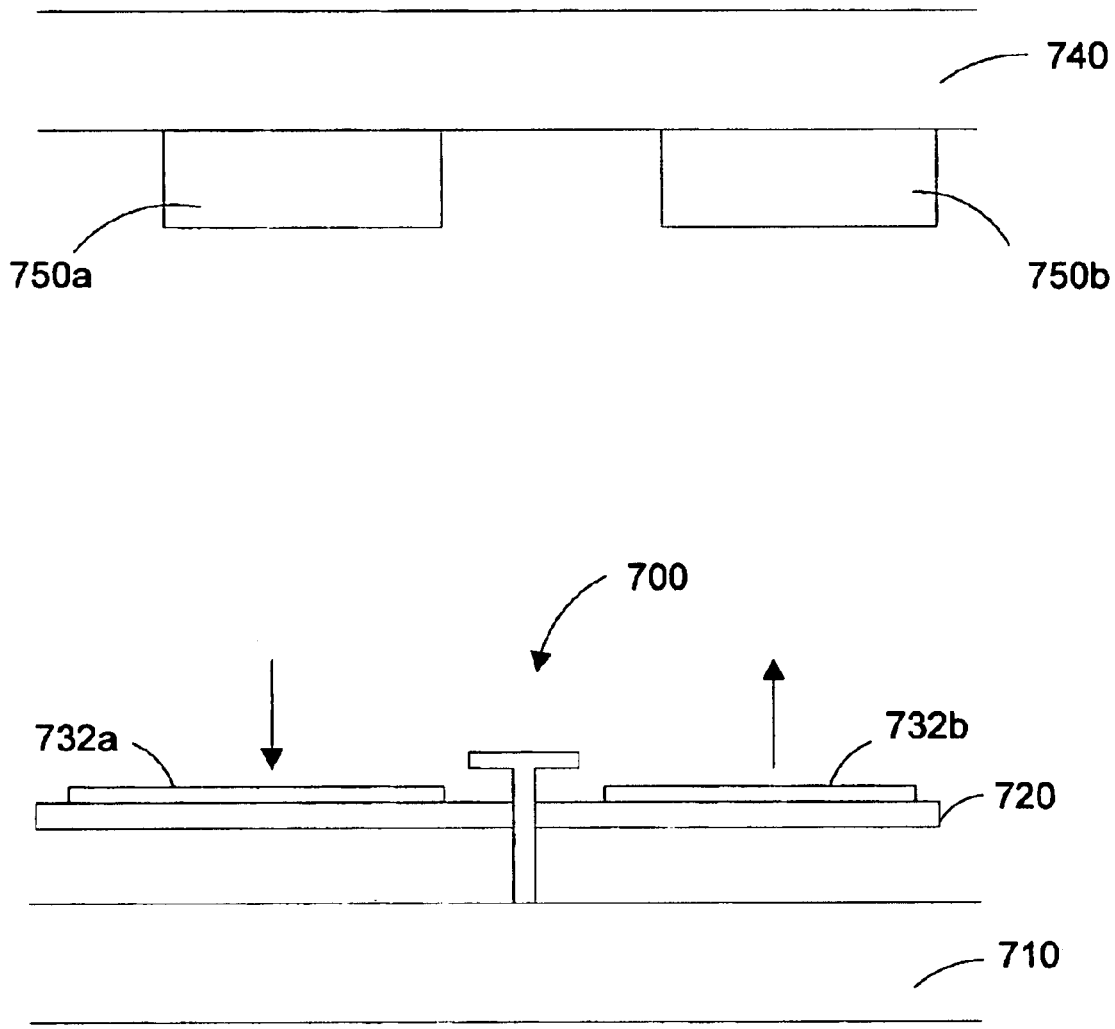
FIG. 7B illustrates a side view of the deflectable micromirror structure of FIG. 7A.
Figure 8:
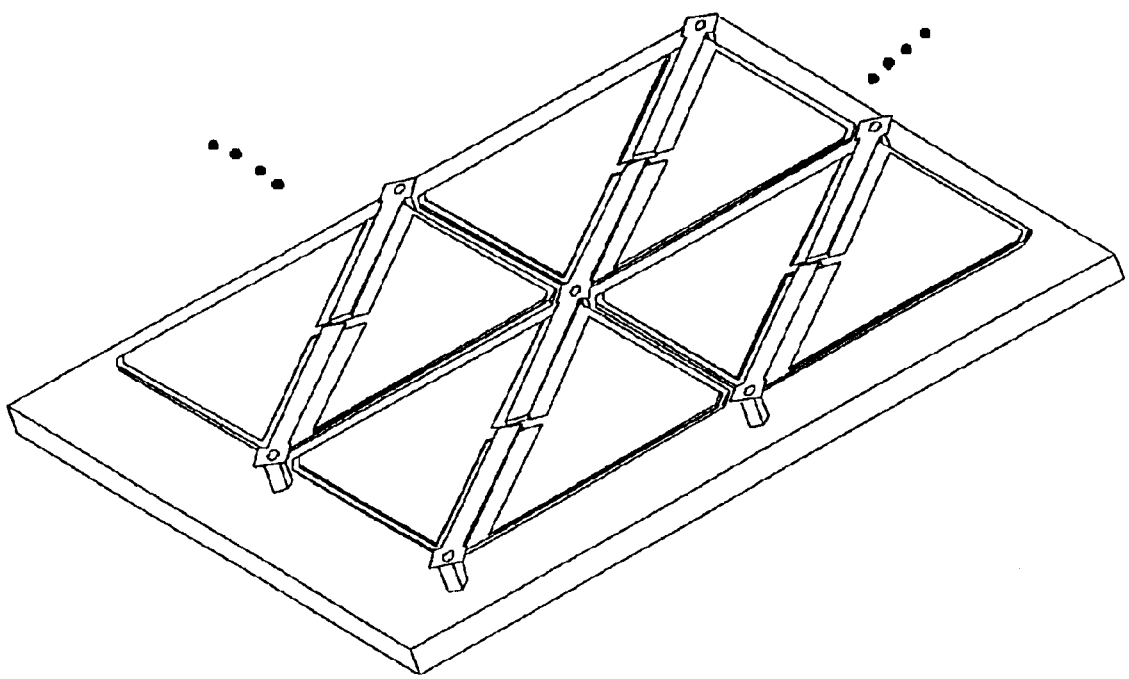
FIG. 8 illustrates a perspective view of a small section of an exemplary mirror array that includes a micro-mirror structure of FIG. 7A according to one embodiment of the present invention.

FIG. 7A illustrates a perspective view of a deflectable micro-mirror structure 700 in accordance with another embodiment of the present invention. FIG. 7B illustrates a side view of the deflectable micro-mirror structure 700. Deflectable micro-mirror structure 700 can be fabricated by a process similar to process 400. It should be noted that micro-mirror structure 700 is typically fabricated as part of a mirror array that may have many mirrors. For simplicity, other mirror structures of the mirror array are shown in FIGS. 7A and 7B. The mirror array may be made up of a large number of micro-mirror structures. A small section of an exemplary mirror array 800 according to the present embodiment is shown in FIG. 8.

In the present embodiment, a mirror plate 720 is suspended above, and deflectably coupled to an optically transmissive substrate 710 by means of a mirror support structure. As shown in FIG. 7A, the mirror support structure includes a torsion hinge 734 that extends diagonally across two corners of mirror plate 720. Further, torsion hinge 734 is connected to electrodes 732a and 732b that are symmetrical about the torsion hinge 734. Mirror plate 720 is attached to electrodes 732a and 732b.

With reference to FIG. 7B, electrodes 732a and 732b are aligned with electrodes 750a and 750b, respectively, of semiconductor substrate 740. According to the present embodiment, electrodes 732a and 732b are held at a constant voltage. In order to deflect mirror plate 720, either one voltage bias is applied to electrode 750a for pulling the electrode 732a towards the electrode 750a, or a voltage bias is applied to electrode 750b for pulling the electrode 732b towards the electrode 750b.

Deflection of the mirror plate 720 is stopped when one corner of the mirror plate 720 comes into contact with the optically transmissive substrate 710. In addition, the mirror plate 720 can also come into contact with the torsion hinge 734. Thus, in the embodiment as shown in FIGS. 7A and 7B, the micro-mirror structure 700 is configured for resisting the deflection of the mirror plate 720 beyond a certain predetermined tilt.

Figure 9:
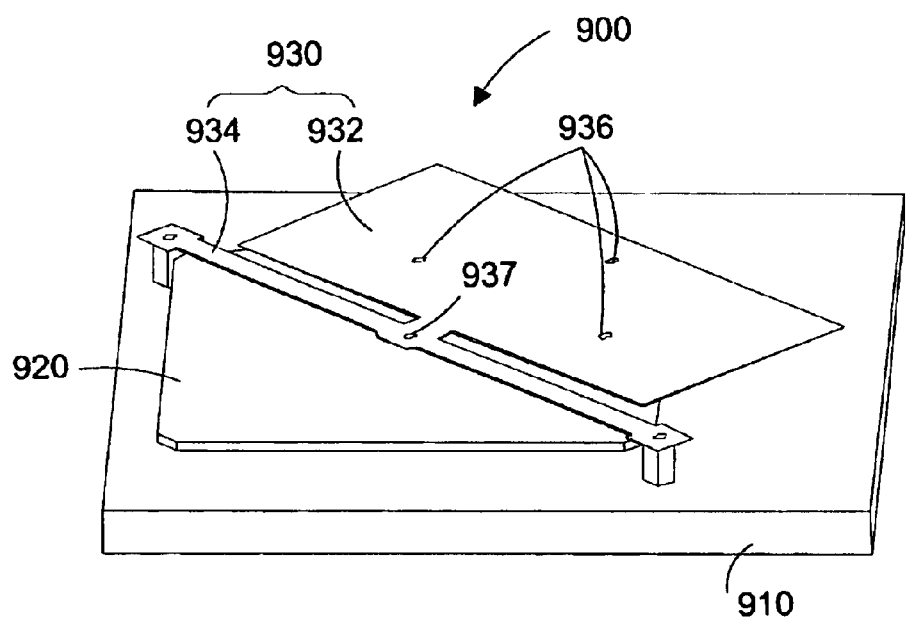
FIG. 9 illustrates a perspective view of a deflectable micro-mirror structure in accordance with yet another embodiment of the present invention.
Figure 10:
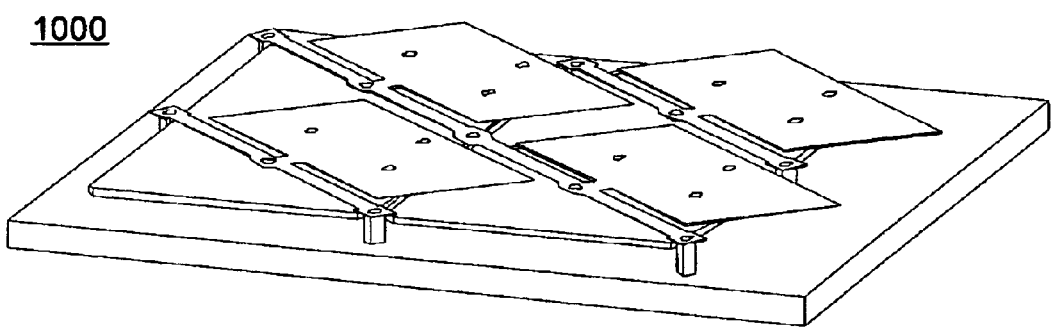
FIG. 10 illustrates a perspective view of a small section of an exemplary mirror array that includes a micro-mirror structure of FIG. 9 according to one embodiment of the present invention.

FIG. 9 illustrates a perspective view of a deflectable micro-mirror structure 900 in accordance with yet another embodiment of the present invention. Micro-mirror structure 900 is typically fabricated as part of a mirror array having a large number of mirrors. A small section of an exemplary micro-mirror array 1000 according to one embodiment is shown in FIG. 10.

With reference to FIG. 9, a mirror plate 920 is suspended above, and deflectably coupled to, optically transmissive substrate 910 by means of a mirror support structure 930. Mirror support structure 930 includes a torsion hinge 934 that extends across two corners of mirror plate 920. Torsion hinge 934, as shown, is attached to mirror plate 920 by means of support 937. Also illustrated in FIG. 9 is an electrode 932 that is electrically connected to and is co-planar with torsion hinge 934. Electrode 932 is attached to mirror plate 920 by means of supports 936.

Figure 11:
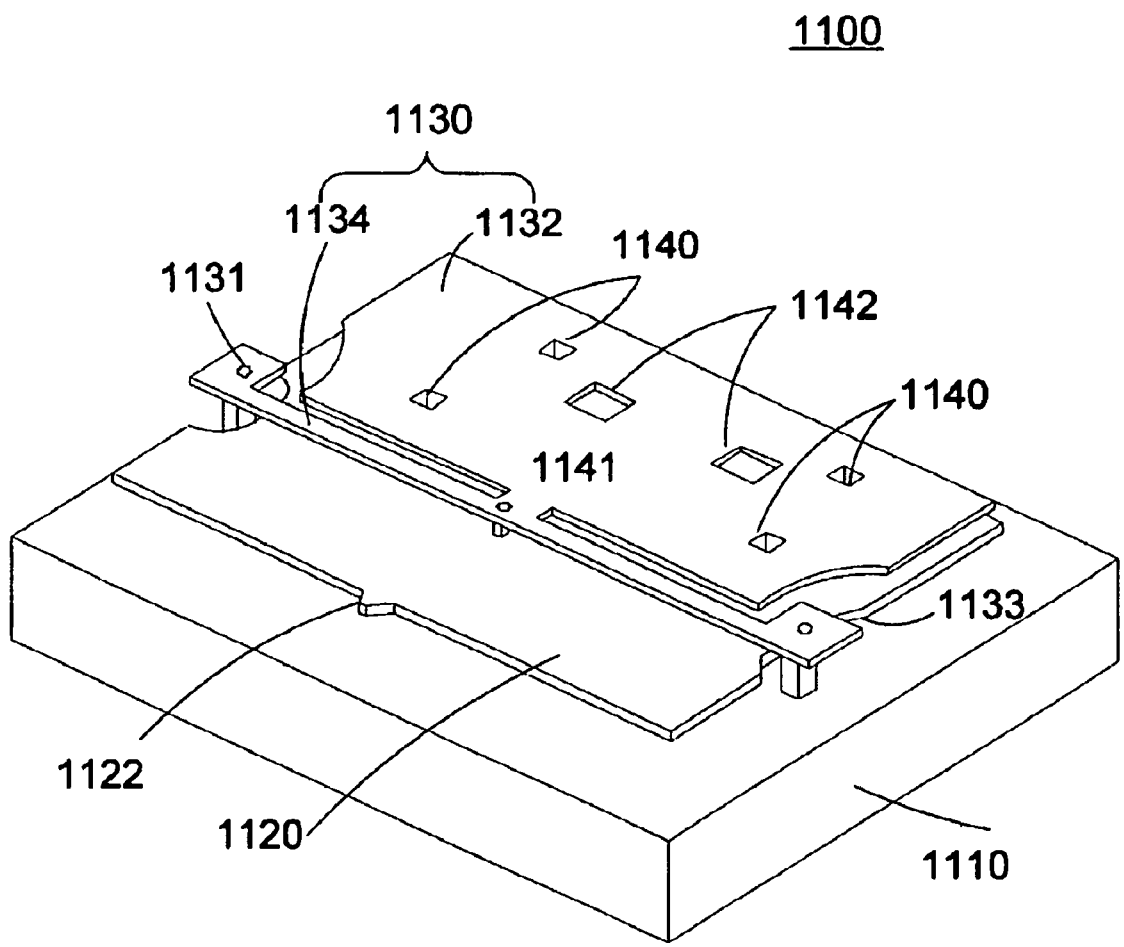
FIG. 11 illustrates a perspective view of a deflectable micro-mirror structure in accordance with yet another embodiment of the present invention.

FIG. 11 illustrates a deflectable micro-mirror structure 1100 in accordance with yet another embodiment of the present invention. In the embodiment as shown in FIG. 11, a mirror plate 1120 of micro-mirror structure 1100 is suspended above, and deflectably coupled to, optically transmissive substrate 1110 by means of a mirror support structure 1130. Mirror plate 1120 has a reflective front surface that faces optically transmissive substrate 1110, and a back surface that faces the actuating circuitry substrate. In one embodiment, mirror plate 1120 is substantially rigid and may be made up of a laminate having layers of silicon nitride and aluminum.

With reference still to FIG. 11, mirror support structure 1130 includes two hinge supports 1136 and 1138 attached to the optically transmissive substrate 1110. The mirror support structure 1130 also includes a torsion hinge 1134 that extends across and attaches to the back surface of mirror plate 1120 by means of support 1141. Also attached to the back surface of mirror plate 1120 is an electrode 1132. In the embodiment as illustrated, electrode 1132 is co-planar with torsion hinge 1134, and is attached to mirror plate 1120 by means of supports 1140. In the present embodiment, supports 1140 and 1141 are formed by first pattern etching a sacrificial layer of silicon to create holes that reach down to the mirror plate 1120, and then depositing a hinge-electrode laminate over the holes. Electrode 1142 also includes openings 1132 for facilitating the removal of sacrificial materials that are beneath the electrode 1132 during the fabrication process.

Also illustrated in FIG. 11 are deflection stoppers 1131 and 1133 that are configured for resisting deflection of mirror plate 1120 beyond a pre-determined tilt angle. Particularly, when mirror plate 1120 is deflected to the pre-determined tilt angle, part of mirror plate 1120 can come into contact with deflection stoppers 1131 and 1133. In addition, in the present embodiment, micro-mirror structure 1100 is configured such that, when mirror plate 1120 comes into contact with deflection stoppers 1131 and 1133, one edge of mirror plate 1120 can come into contact with optically transmissive substrate 1110. In the illustrated embodiment, mirror plate 1120 includes bump 1122 positioned along the substrate-touching edge such that the area of contact between mirror plate 1120 and substrate 1110 is reduced, thus reducing contact forces.

In the embodiments shown, there are dual stopping mechanisms whereby the deflectable element is stopped by two different types or abutments. In one example, the deflectable element abuts against the optically transmissive substrate at one or more locations. In addition, the deflectable element abuts against a post and hinge assembly (whether before, after, or at the same time as abutting against the optically transmissive substrate). However, it should be noted that the two stopping mechanisms need not be provided together. A single stopping mechanism, where a portion of the hinge and post assembly stops the pivoting of the deflectable element, can be sufficient. Or, a post and lip assembly separate from the hinge can alone stop the deflectable element, or be used as a backup stop to (or together with) the abutment of the deflectable element against the optically transmissive substrate.

Figure 12:
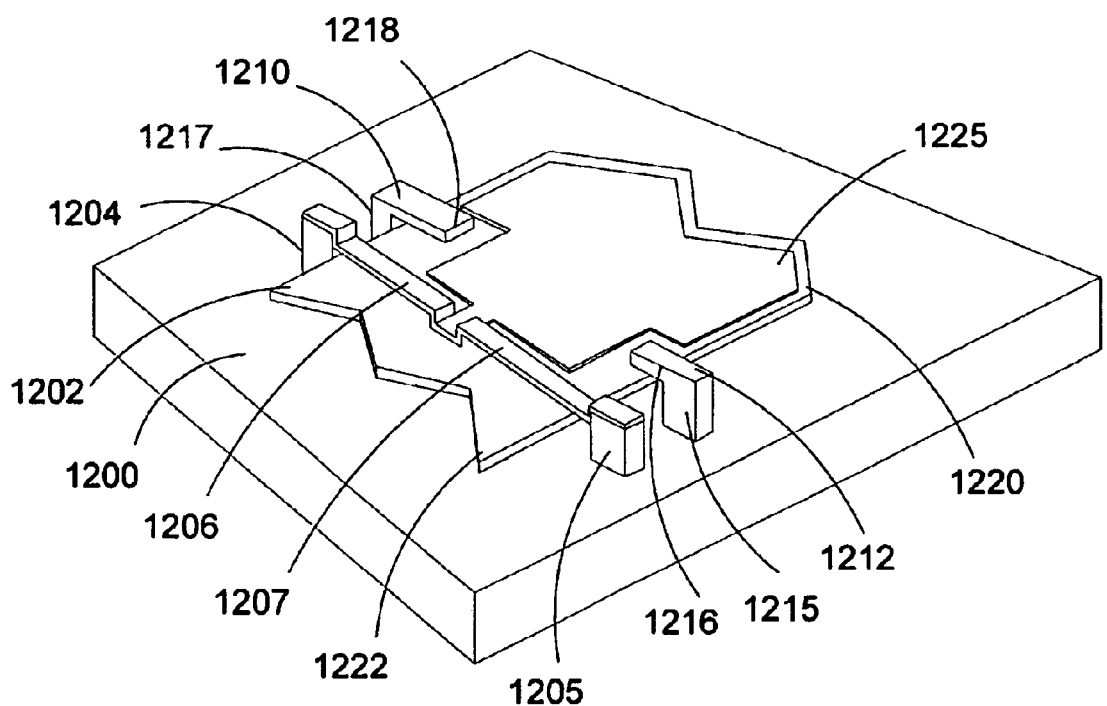
FIG. 12 illustrates an embodiment of the invention where deflection stopping mechanisms are provided separate from the post and hinge assembly.
Figure 13:
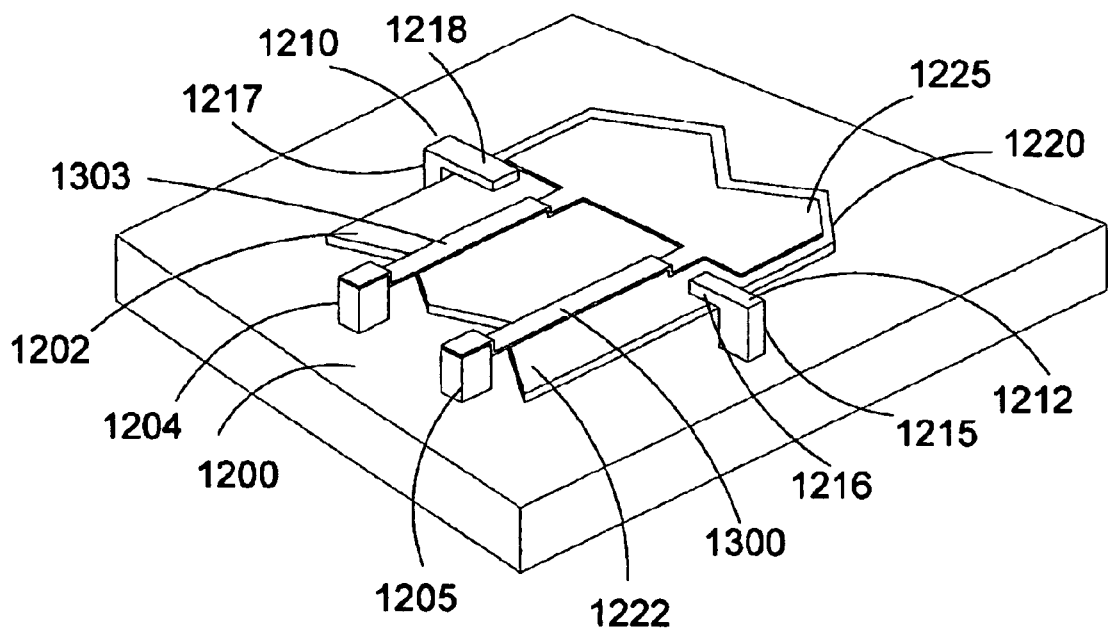
FIG. 13 illustrates an embodiment similar to that shown in FIG. 12, with flexure hinges instead of torsion hinges.

As can be seen in FIG. 12, deflectable element 1202 can be pivotably held on optically transmissive substrate 1200 by means of posts 1204, 1205 and hinges 1206, 1207. As can be seen in FIG. 12, deflection stoppers 1210, 1212 are not provided as part of the post and hinge assembly, but rather are separately provided spaced apart from the posts and hinges. The deflection stoppers are made of posts 1215,1217 and corresponding lips or protrusions 1216, 1218. In operation, a first portion 1222 of deflectable element 1202 pivots towards the optically transmissive substrate 1200 as a second portion 1220 pivots away from the optically transmissive substrate (due to electrostatic attraction of electrode 1225 to an opposing electrode on a circuit substrate (not shown). The deflectable element can be constructed to abut against deflection stoppers 1210, 1212 before, after, or at the same time as the first portion of the deflectable element comes into contact with the optically transmissive substrate (or the deflection stoppers alone may be used to stop the deflection of the deflectable element). FIG. 13 is a similar embodiment to that illustrated in FIG. 12 (with like numerals identifying like structural elements), except that flexure hinges 1300, 1303 take the place of the torsion hinges in FIG. 12.

Figure 14A:
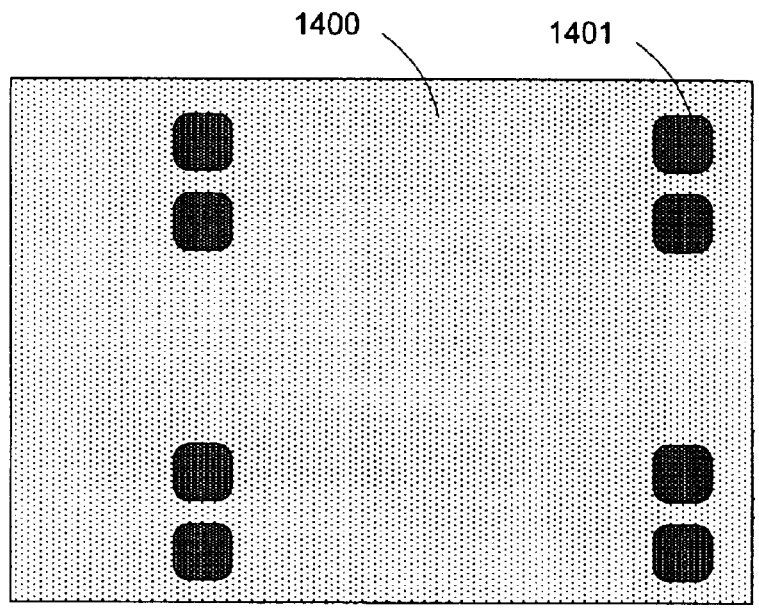
FIGS. 14A to 14H illustrate a further method for making a micromirror with stopping mechanisms.

The formation of another embodiment of a micromirror in accordance with the invention is shown in the FIGS. 14A–14H. FIG. 14A shows mirror structural layer 1400. This mirror structural layer is formed on a sacrificial layer, which sacrificial layer is deposited on a substrate, such as an optically transmissive substrate (e.g. glass, quartz, etc.). If a top surface of the micromirror structural layer is not sufficiently hard, an additional layer or pad of a hard material is deposited and patterned to form pads 1401 on the mirror structural layer. Examples of a hard material that may be used for the pad layer include metals, metal alloys, and metal compounds. More specifically, the landing pad can be formed of a transition metal from columns 4B, 5B or 6B of the periodic table, or alloys or compounds thereof, such as compounds of titanium or tungsten. The landing pad can comprise a metal alloy of two or more of titanium, tungsten, aluminum and copper. The landing pad can also comprise titanium nitride, titanium oxide, titanium oxynitride, titanium carbide, tungsten, tungsten carbide, silicon nitride, silicon oxynitride, silicon carbide or silicon oxide.

Figure 14B:
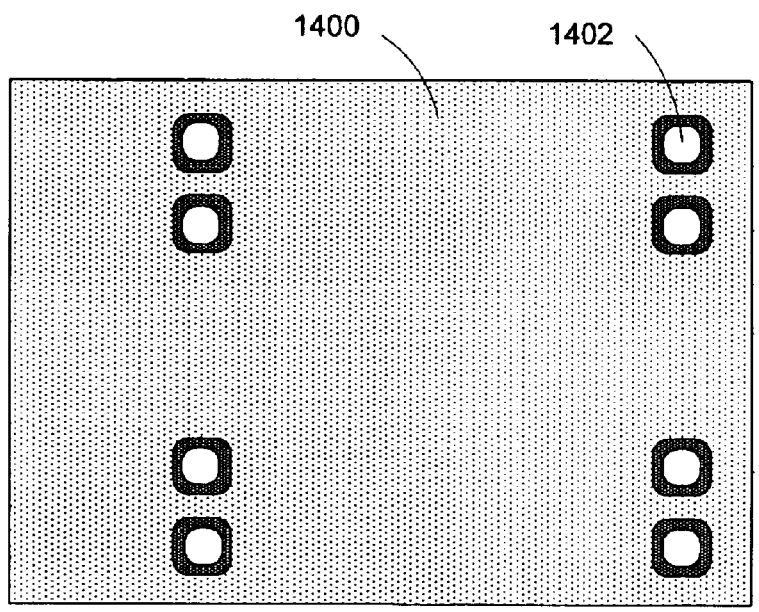

Additional layer (or layers) may be deposited and etched such that the hard material that forms pad 1401 is exposed through hole 1402, as seen in FIG. 14B. The purpose of this additional layer (or layers) is to provide the mirror structure with certain desirable structural or other characteristics. For example, it may be desirable to provide an equal amount of strain on both front and back of the mirror structure. Therefore, it may be desirable to form a mirror structure that is a laminate where an inner layer of the laminate is a reflective and/or conductive material and both the outer layers on either side of the reflective/conductive layer are of the same material and/or thickness. However, the outer layers need not be the same, but preferably have the same strain characteristics so as to avoid deformation of the micromirror due to strain differences on either side of the micromirror. Hole 1402 allows the hard material that forms pad 1401 to act as the contact point for the mirror stopping mechanism. Of course, if the structural materials of the micromirror are sufficiently hard, hard pad 1401 is not needed.

Figure 14C:
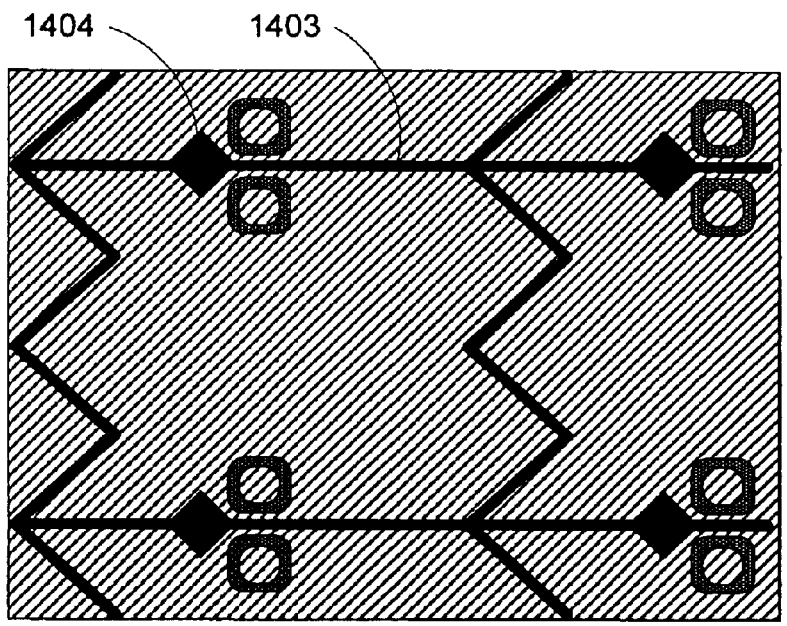

Next, as can be seen in FIG. 14C, individual micromirror plates are formed by etching trenches 1403. There exist a wide variety of mirror shapes that may be formed. Some examples are square, diamond, and jagged (as shown)—though any desired micromirror shape can be patterned at this stage. Post region 1404 is also formed by etching away micromirror structural material in these areas.

Figure 14D:
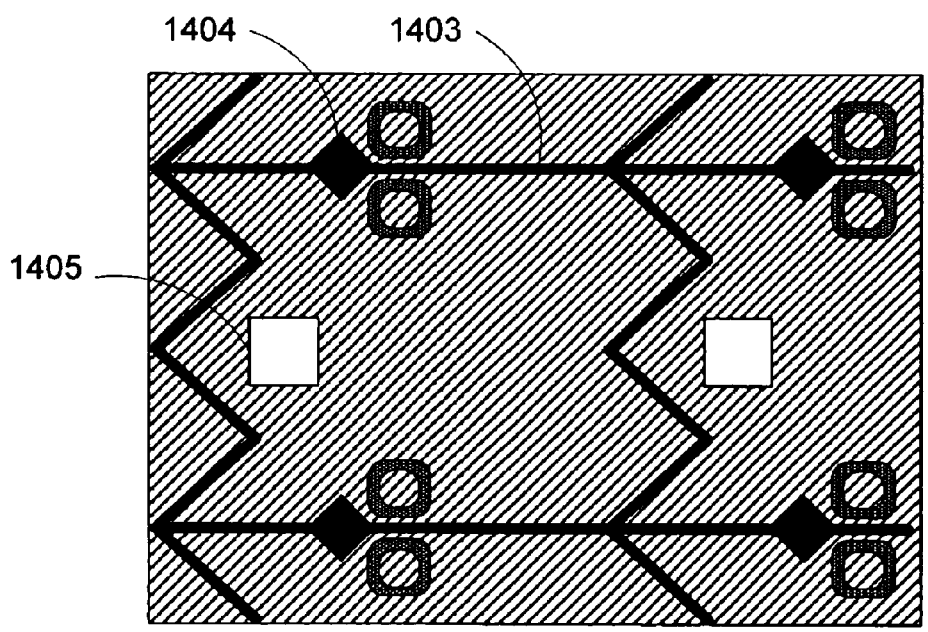
Figure 14E:
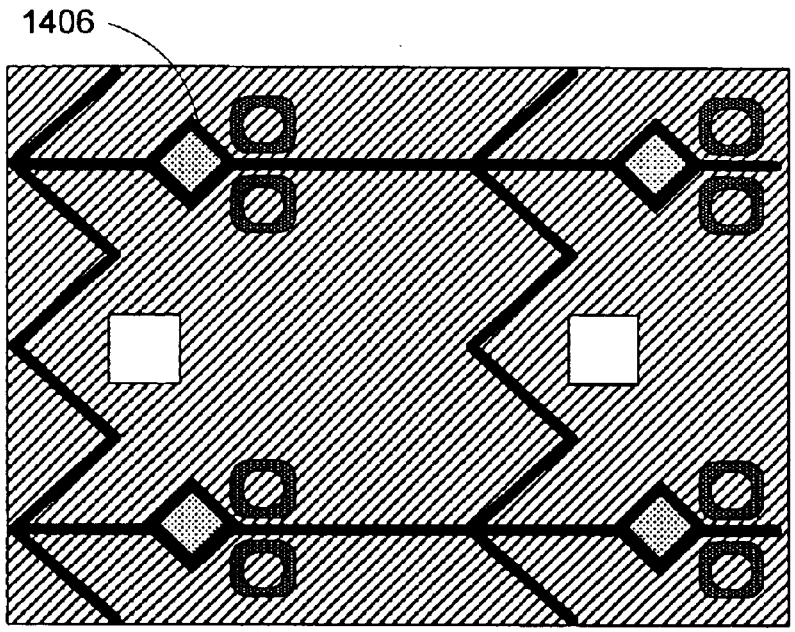

A second sacrificial layer is deposited for the purpose of forming a gap between the mirror and the hinge structure at the time of release of the micromirror. This second sacrificial layer is deposited after trench 1403 is etched. FIG. 14D shows mirror contact formation 1405 that is formed by etching through the second sacrificial layer. Likewise, substrate contact formation 1406 is formed by etching through the second sacrificial layer, as shown in FIG. 14E.

Figure 14F:
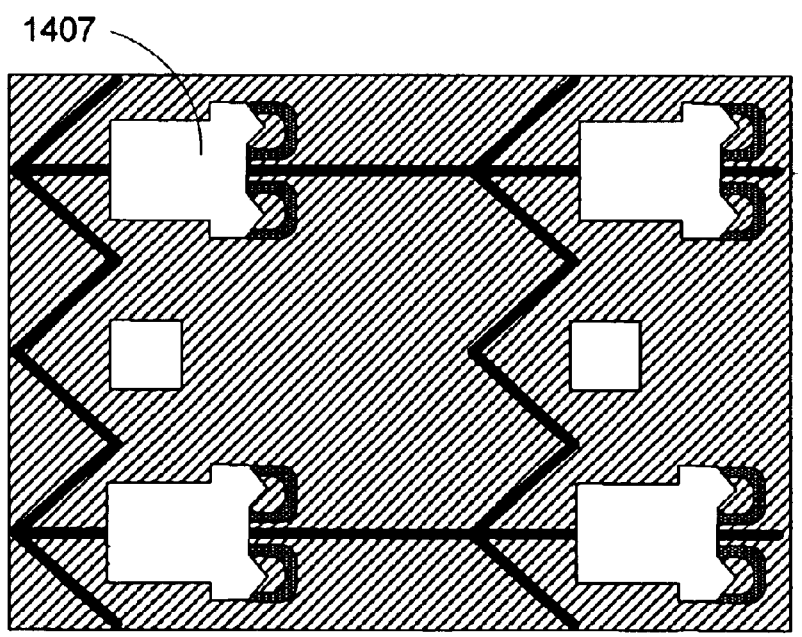

FIG. 14F shows structure 1407 that is formed by deposition and etching of a suitable material. Structure 1407 may be composed of one, two, three, or more layers. In one embodiment it is formed of three layers in a symmetric fashion, where the two outside layers are composed of the same material and are the same thickness. In another embodiment the two outside layers are composed of the same material, but are of different thickness. In yet another embodiment the two outside layers are of different materials and/or thickness. Examples of materials that may be used to form the layer (or layers) are metals, metals alloys, and metal compounds. In one specific example, a laminate of titanium (or an alloy or compound thereof) and silicon nitride (or other ceramic) is formed, and in another specific example, a laminate of titanium (or an alloy or compound thereof), silicon nitride (or other ceramic) and titanium (or an alloy or compound thereof) is formed. Of course, other laminates are possible.

Figure 14G:
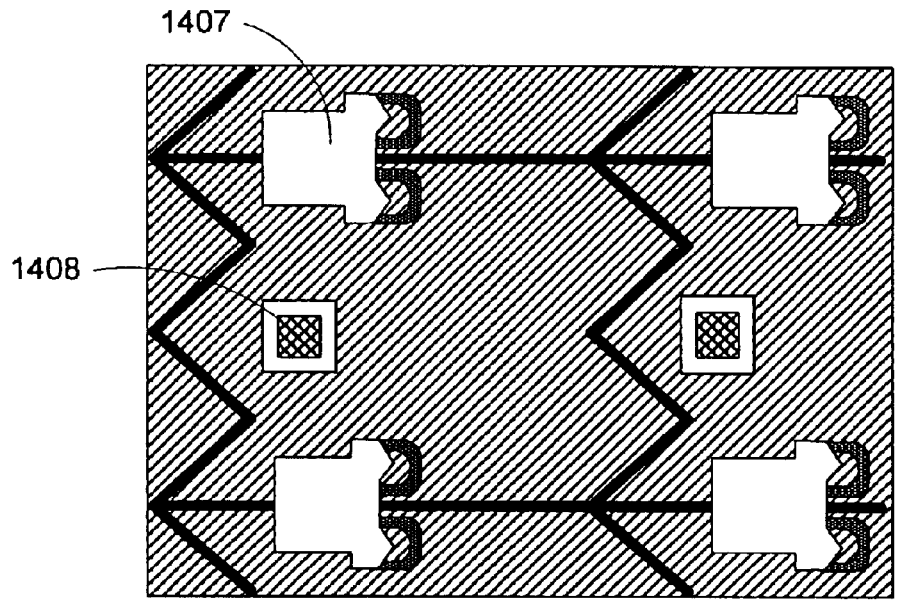
Figure 14H:
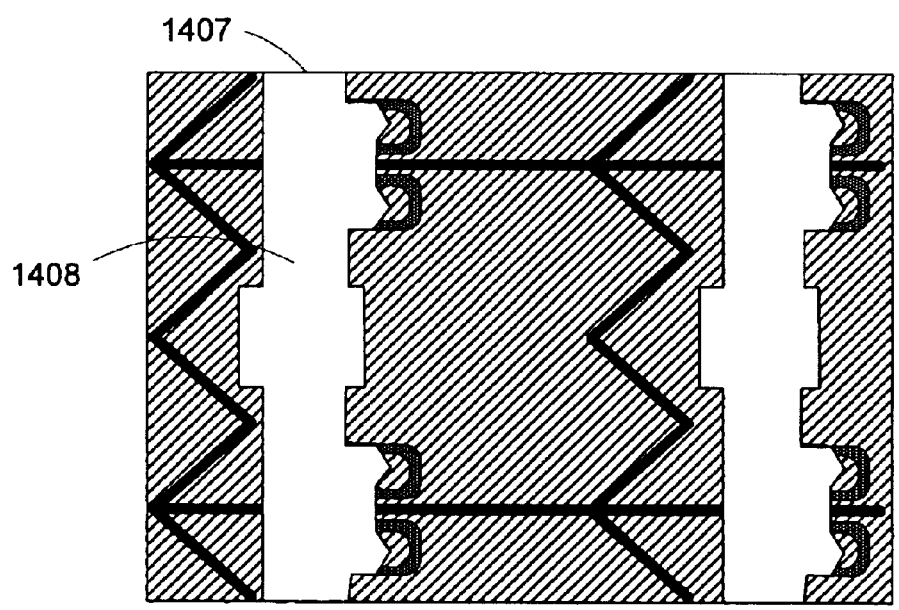

The layer or layers that form hinge structure 1409, as seen in FIG. 14H, are now deposited on the second sacrificial layer. The hinge structure may be composed of one, two, three, or more layers. In the case of multiple layers it may be desirable to form a contact between non-adjacent layers, in which case hinge contact formation 1408 may be etched, as seen in FIG. 14G. Hinge contact formation 1408 can be etched between depositions of the various layers that form the hinge structure. In one embodiment, formation 1408 is essentially a hole that is etched through any intervening layers that lie between the non-adjacent contact layers (e.g. if an insulating layer is present in a laminate at this stage, an aperture can be formed in the insulating layer so as to allow for electrical conductivity down to a lower conductive layer). In another embodiment, this formation is a hole that is etched through to the mirror structure. FIG. 14H shows one embodiment of the final formation of the invention, where hinge structure 1409 has been formed. In this embodiment, after release of the micromirror elements, micromirror rotation can be stopped by contact between structure 1407 and pads 1401.

Figure 15A:
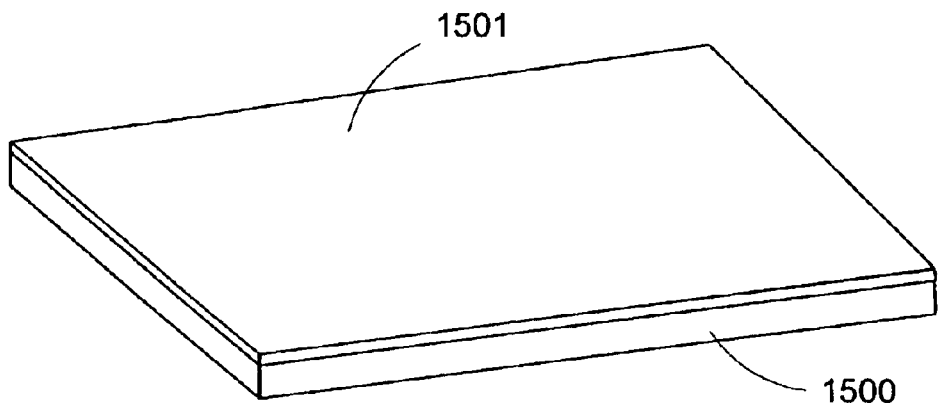
FIGS. 15A to 15E illustrate another example of a method for making a micromirror with stopping mechanisms.
Figure 15B:
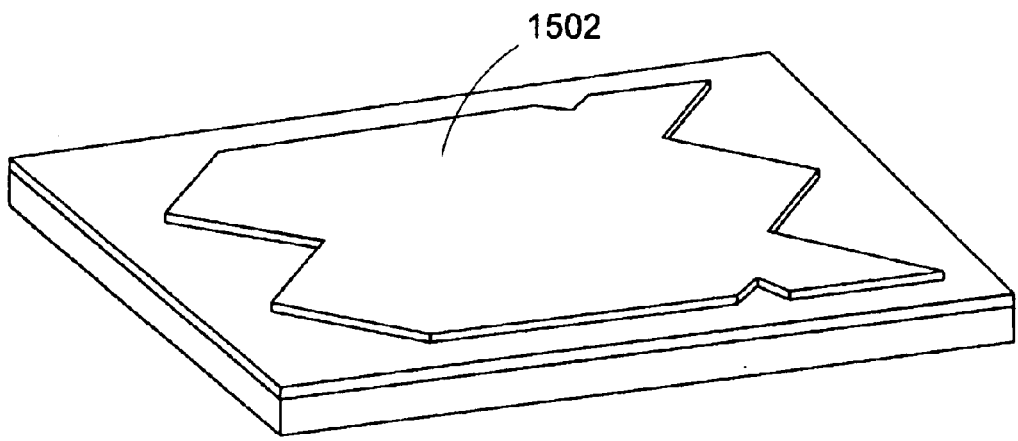

A further embodiment of the invention is illustrated in FIGS. 15A to 15E. As can be seen in FIG. 15A, a substrate 1500 is provided (conductive, insulating, semiconductor, etc.) that can be an optically transmissive substrate such as glass, quartz, sapphire, etc. On substrate 1500 is deposited a sacrificial later 1501 that will be removed at the time of release of the micromirrors being formed. The sacrificial layer can be any suitable layer, such as an organic material (e.g. a polymer), SOG, a-Si, etc. On the sacrificial layer 1501, as can be seen in FIG. 15B, is deposited a mirror structural layer that is patterned to define a micromirror element 1502. The micromirror element can have any desired shape, such as the one illustrated in FIG. 15B. The material(s) deposited for the micromirror structure can be any suitable material—such as ceramic (silicon nitride, silicon oxide, etc.), metal or metal alloy (aluminum, titanium and alloys thereof, etc.) and/or multilayer "laminate" structures that are formed by depositing multiple layers (e.g. a laminate of ceramic and metal (or metal alloy). Essentially any material can be deposited that will have the desired ultimate properties and that can be deposited in a manner complimentary to the overall process.

Figure 15C:
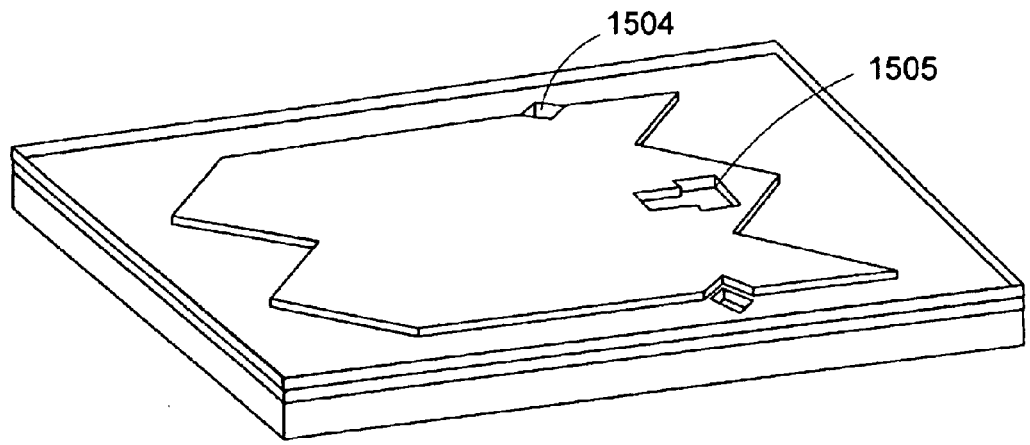

Then, as can be seen in FIG. 15C, a second sacrificial layer 1503 is deposited on micromirror element 1502 and first sacrificial layer 1501. Second sacrificial layer 1503 need not be the same as the first sacrificial layer, though in the present example, the two layers are made of the same material. As can also be seen in FIG. 15C, apertures 1504 are formed that extend down through both sacrificial layers 1501 and 1503 to the substrate 1500, and an aperture 1505 is formed that extends through the second sacrificial layer 1503 down to micromirror element 1502. The formation of the apertures can be achieved by standard photoresist application and patterning, followed by etching the sacrificial material in exposed areas.

Figure 15D:
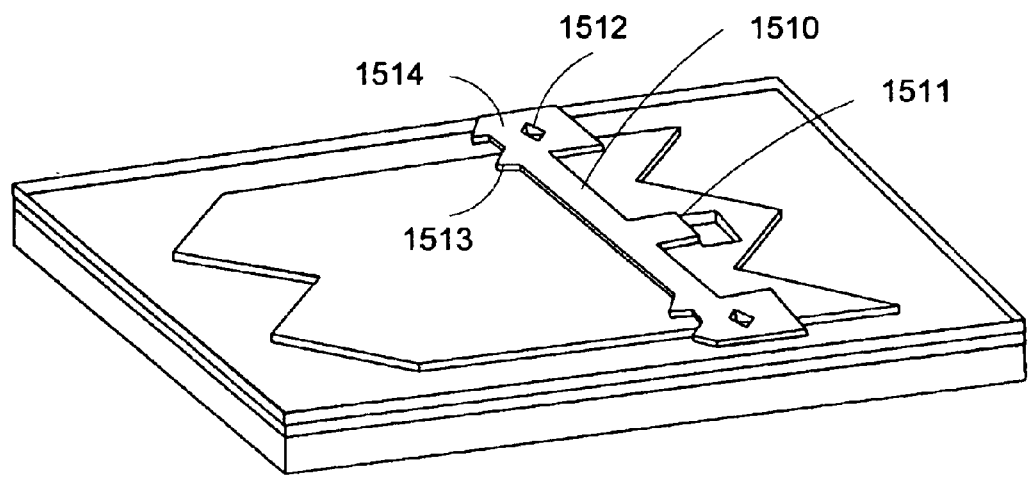

As can next be seen in FIG. 15D, a relatively stiff structural layer is deposited and patterned so as to form mirror structural connection pad 1511, post and cap assembly 1514 (with indentations 1512 due to the original apertures 1504 in the sacrificial layers), stop protrusions 1513, and elongated beam 1510. The material of these structures formed from this layer can be any suitable material, such as a ceramic (silicon nitride, silicon oxide, titanium nitride, etc.) that will have suitable stiffness and structural integrity during operation of the micromirror device. These structures 1510–1514 can also be formed from a laminate structure of two or more layers (e.g. a metal-ceramic laminate, a metal-ceramic-metal laminate, a ceramic-metal-ceramic laminate, etc.).

Figure 15E:
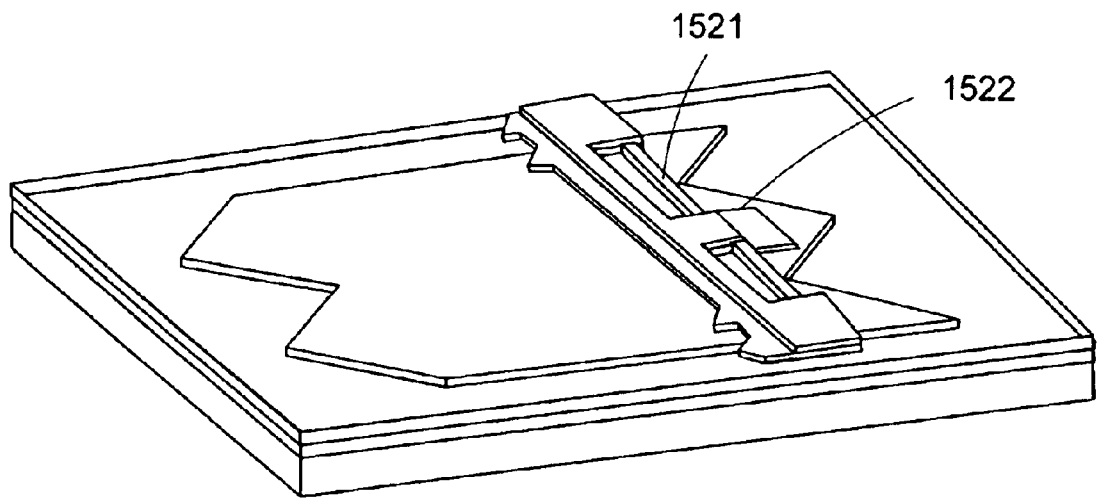

Next, as seen in FIG. 15E, an electrically conductive layer is deposited and patterned so as to form an electrical connection 1522 to underlying mirror element 1502, a flexible hinge 1521 and an electrical connection 1520 across underlying beam 1510. The material for forming this electrically conductive layer can be a metal, metal alloy, metal compound (with at least some conductivity), etc., or a laminate structure with at least one layer in the laminate being a metal, metal alloy, metal compound, etc. In one embodiment of the invention, structures 1520 to 1522 are formed of a thinner layer (or laminate) than the layer (or laminate) used to form structures 1510 to 1514. Also, the layer (or laminate) of structures 1520 to 1522 can be formed at a time in the process different (e.g. after—or even before) from the time of formation of structures 1510 to 1514.

Figure 16A:
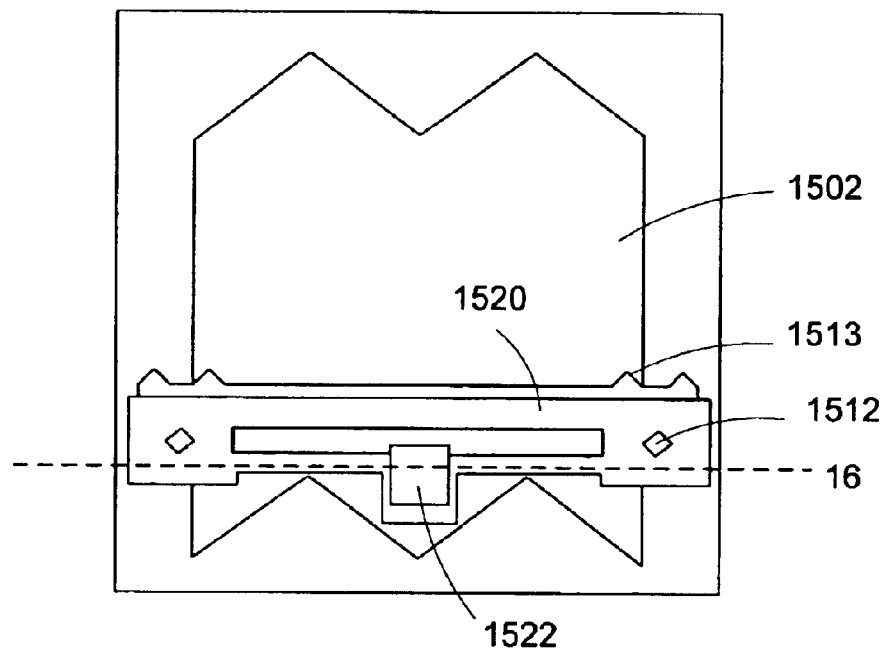
FIGS. 16A, 16B and 17 are further views of the micromirror made in accordance with the process of FIGS. 15A to 15E.
Figure 16B:
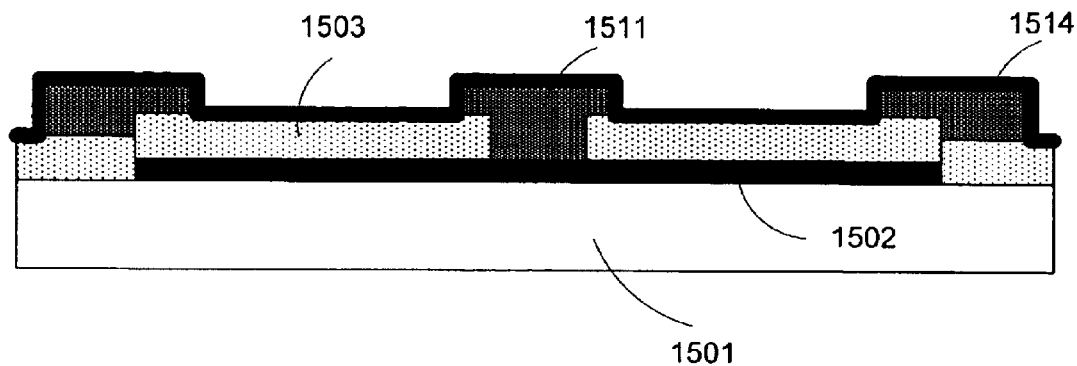
Figure 17:
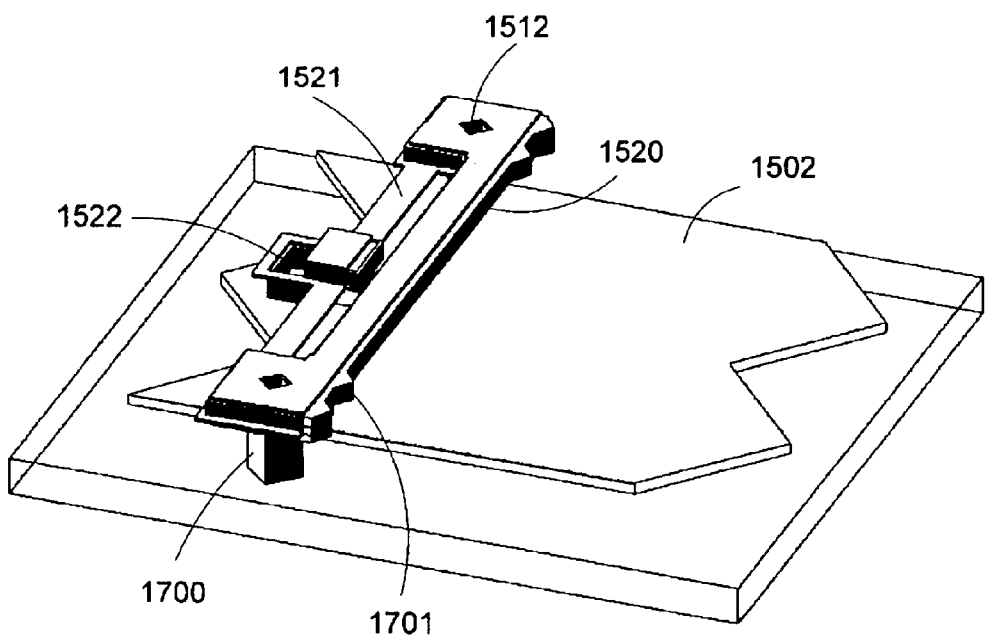

FIG. 16A is a top view of the unreleased micromirror illustrated in FIG. 15E, and FIG. 16B is a cross sectional view of the unreleased micromirror taken along line 16—16 in FIG. 16A. A next step in the process is removing the sacrificial layers so as to release the micromirror so as to be pivotably held on the substrate 1500. If both sacrificial layers are of the same material, these two layers can be removed at the same time (if formed of different materials, the two layers can be removed with different removal chemistry consecutively if desired). Of course, the etchant or chemical used is selected so as to selectively remove the sacrificial layer(s) without appreciably removing micromirror structural material. For example, different polyimides and photoresists can be removed in an oxygen plasma, whereas various silicon materials (e.g. amorphous silicon) can be removed in noble gas halides (e.g. xenon difluoride) or interhalogens (bromine trifluoride, bromine trichloride, etc.). It is preferred that the etchant in this example is a spontaneous chemical etchant that is not energized to a plasma state in order to remove the sacrificial layer(s). FIG. 17 illustrates the micromirror held on posts 1700 to the substrate after release.

Figure 18A:
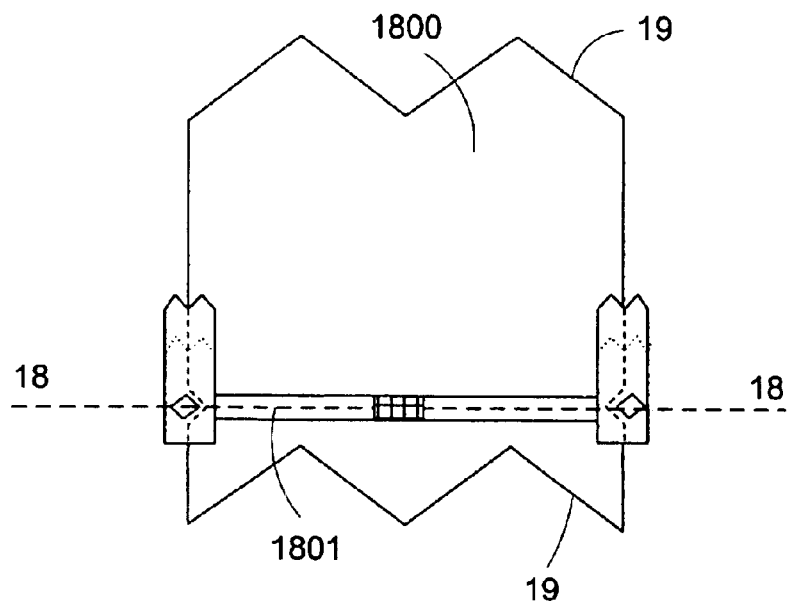
FIGS. 18A to 18C are views of another embodiment of the invention with a multilevel stopping mechanism.
Figure 18B:
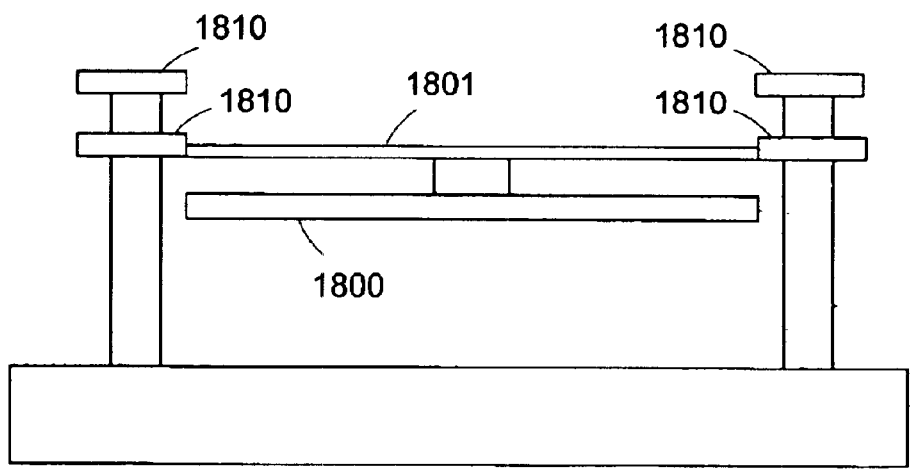
Figure 18C:
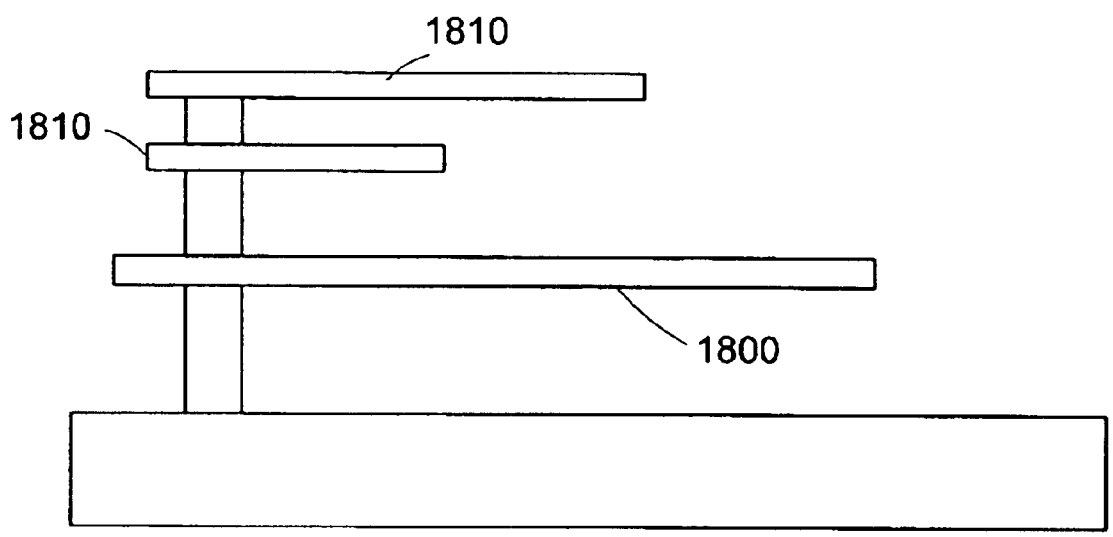

Another embodiment of the invention is shown in FIGS. 18A–18C. FIG. 18A shows a top view of a single micromirror 1800 with a hinge 1801. FIG. 18B is a cross section taken along line 18—18 of FIG. 18A. As can be seen in FIG. 18B, a micromirror 1800 is supported by hinge 1801. The axis of rotation of the micromirror runs from left to right along the hinge. When the micromirror is rotated far enough, it comes to a point where further rotation is stopped because of contact between the micromirror and the four structures 1810. In the embodiment with pads 1401, contact is between the pads (rather than the micromirror) and the structures 1810.

FIG. 18C shows another cross-section view (cross section 19—19 from FIG. 18A). When micromirror 1800 is rotated far enough, further rotation is stopped by contact with structures 1810. Micromirror 1800 and structures 1810 can be formed by processes similar to those described above for other embodiments of the micromirror array. Likewise, micromirror 1800 and structures 1810 can be formed of similar materials to those described above for other embodiments of the micromirror array. It should be noted that the four structures 1810 is a feature of but one embodiment. Other embodiments may use either more or less than four structures 1810.

It should be appreciated that the present invention has been described in relation to specific examples above. However, it should be noted that specific examples within the present disclosure should not be construed to limit the scope of the present invention, as many variations are possible. The features (materials, method steps, structural features, etc.) disclosed herein are not mandatory or otherwise required, but instead can be modified, augmented or replaced with other features. The scope of the present invention should be construed according to the claims below.

What is claimed is:

1. A spatial light modulator, comprising:
   a first substrate;
   a deflectable element having a landing pad and that is held on the first substrate via a hinge and stop assembly, the hinge connected to the deflectable element so as to allow the deflectable element to pivot along around an axis, and the stop positioned to arrest the pivoting of the deflectable element by abutting against the landing pad on the deflectable element;
   wherein the deflectable element is held on a bottom surface of the first substrate,
   wherein the deflectable element has first and second portions such that during deflection of the deflectable element, the second portion moves towards the bottom surface as the first portion moves away from the bottom surface; and
   wherein part of said first portion abuts against an area of the hinge and stop assembly.

2. A spatial light modulator, comprising:
   a first substrate;
   a deflectable element having a landing pad and that is held on the first substrate via a hinge and stop assembly, the hinge connected to the deflectable element so as to allow the deflectable element to pivot along around an axis, and the stop positioned to arrest the pivoting of the deflectable element by abutting against the landing pad on the deflectable element;
   wherein the deflectable element is held on a bottom surface of the first substrate,
   wherein the deflectable element has first and second portions such that during deflection of the deflectable element, the second portion moves towards the bottom surface as the first portion moves away from the bottom surface;
   wherein part of said first portion abuts against an area of the hinge and stop assembly; and
   wherein part of said second portion abuts against an area of the first substrate.

3. A spatial light modulator comprising:
   a first substrate that is transmissive to visible light;
   a deflectable element pivotably held on the first substrate via a hinge;
   a stopping mechanism constructed such that when the deflectable element pivots, a portion of the deflectable element abuts against the stopping mechanism so as to stop the movement of the deflectable element;
   wherein at least one of the deflectable element, hinge and stopping mechanism is fanned of a laminate of three or more layers; and
   wherein an interior layer of the laminate is a ceramic layer, with metal, metal alloy or metal compound layers being disposed within the laminate on opposite sides of the ceramic interior layer.

4. A spatial light modulator comprising:
   a first substrate that is transmissive to visible light;
   a deflectable element pivotably held on the first substrate via a hinge;
   a stopping mechanism constructed such that when the deflectable element pivots, a portion of the deflectable element abuts against the stopping mechanism so as to stop the movement of the deflectable element;
   wherein at least one of the deflectable element, hinge and stopping mechanism is formed of a laminate of three or more layers; and
   wherein an interior layer of the laminate is a metal, metal alloy or metal compound layer with layers on opposite sides of the interior layer comprising an insulating ceramic compound.

5. A spatial light modulator comprising:
   a first substrate that is transmissive to visible light;
   a deflectable element pivotably held on the first substrate via a hinge, wherein the deflectable element further comprises a first portion and a second portion such that when the deflectable element pivots, the second portion moves towards the first substrate as the first portion moves away from the first substrate;
   a stopping mechanism constructed such that when the deflectable element pivots, a portion of the deflectable element abuts against the stopping mechanism so as to stop the movement of the deflectable element;
   wherein at least one of the deflectable element hinge and stopping mechanism is formed of a laminate of three or more layers;
   wherein an interior layer of the laminate is a metal, metal alloy or metal compound layer with layers on opposite sides of the interior layer comprising an insulating ceramic compound, wherein the second portion is constructed so as to be capable of abutting against the first substrate; and
   wherein the second portion of the deflectable element is constructed so as to be operable of abutting against the first substrate.

6. A spatial light modulator comprising:
   a first substrate that is transmissive to visible light;
   a deflectable element pivotably held on the first substrate via a hinge;
   a stopping mechanism constructed such that when the deflectable element pivots, a portion of the deflectable element abuts against the stopping mechanism so as to stop the movement of the deflectable element;

wherein at least one of the deflectable element, hinge and stopping mechanism is formed of a laminate of three or more layers; and wherein the hinge connects to the post or wall that comprises the stopping mechanism.

7. A spatial light modulator comprising:

an optically transmissive substrate;

a first gap disposed below the optically transmissive substrate;

a pivotable mirror disposed below the first gap via a hinge;

a second gap disposed below the mirror;

a connector that connects the pivotable mirror with the optically transmissive substrate;

a deflection stopper disposed below the second gap, wherein the deflection stopper has a total thickness and rigidity greater than a total thickness and rigidity of the hinge; and wherein said connector comprises said deflection stopper.

8. A spatial light modulator comprising:

an optically transmissive substrate;

a first gap disposed below the optically transmissive substrate;

a pivotable minor disposed below the first gap via a hinge;

a second gap disposed below the mirror;

a deflection stopper disposed below the second gap, wherein the deflection stopper has a total thickness and rigidity greater than a total thickness and rigidity of the hinge; and wherein the deflection stopper is part of the a hinge and post assembly for pivotably holding the mirror to the optically transmissive substrate.

9. A spatial light modulator comprising:

an optically transmissive substrate;

a first gap disposed below the optically transmissive substrate;

a pivotable mirror disposed below the first gap via a hinge;

a second gap disposed below the second gap;

a hinge and post assembly spaced apart from the deflection stopper with the hinge disposed below the second gap; and a deflection stopper disposed below the second gap, wherein the deflection stopper has a total thickness and rigidity greater than a total thickness and rigidity of the hinge.

10. A spatial light modulator comprising;

an optically transmissive substrate;

a first gap disposed below the optically transmissive substrate;

a pivotable mirror disposed below the first gap via a hinge;

a second gap disposed below the mirror;

a deflection stopper disposed below the second gap;

a third gap below the deflection stopper and another deflection stopper disposed below the third gap; and wherein the deflection stopper has a total thickness and rigidity greater than a total thickness and rigidity of the hinge.

11. A spatial light modulator comprising:

an optically transmissive substrate;

a first gap disposed below the optically transmissive substrate;

a pivotable mirror disposed below the first gap via a hinge;

a second gap disposed below the mirror;

a first deflection stopper disposed below the second gap;

a third gap below the first deflection stopper;

a second deflection stopper disposed below the third gap;

a fourth gap below the second deflection stopper and a second substrate that comprises an addressing circuitry and an electrode for electrostatically causing the mirror to pivot being disposed below the fourth gap; and wherein the first deflection stopper has a total thickness and rigidity greater than a total thickness and rigidity of the hinge.

12. A spatial light modulator comprising:

an optically transmissive substrate;

a first gap disposed below the optically transmissive substrate;

a pivotable mirror disposed below the first gap via a hinge;

a second gap disposed below the mirror;

wherein the deflection stopper has a total thickness and rigidity greater than a total thickness and rigidity of the hinge; and wherein the deflection stopper comprises a protrusion that extends below the second gap and a wall or post which connects to the optically transmissive substrate.

* * * * *

UNITED STATES PATENT AND TRADEMARK OFFICE
CERTIFICATE OF CORRECTION

PATENT NO. : 6,741,383 B2 Page 1 of 1
APPLICATION NO. : 10/155744
DATED : May 25, 2004
INVENTOR(S) : Huibersa et al.

It is certified that error appears in the above-identified patent and that said Letters Patent is hereby corrected as shown below:

Column 16,
Line 10, "fanned" should read -- formed --.

Signed and Sealed this

Twentieth Day of June, 2006

JON W. DUDAS
*Director of the United States Patent and Trademark Office*